US011911881B2

(12) United States Patent
Araki et al.

(10) Patent No.: US 11,911,881 B2
(45) Date of Patent: Feb. 27, 2024

(54) DRIVER-DRILL

(71) Applicant: MAKITA CORPORATION, Anjo (JP)

(72) Inventors: Yuta Araki, Anjo (JP); Motohiro Omura, Anjo (JP); Akira Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/140,717

(22) Filed: Apr. 28, 2023

(65) Prior Publication Data

US 2023/0256572 A1 Aug. 17, 2023

Related U.S. Application Data

(63) Continuation of application No. 16/935,758, filed on Jul. 22, 2020, now Pat. No. 11,673,240.

(30) Foreign Application Priority Data

Aug. 6, 2019 (JP) ................................ 2019-144798
Aug. 6, 2019 (JP) ................................ 2019-144799

(51) Int. Cl.
*B25B 21/00* (2006.01)
*B25F 5/00* (2006.01)
*B25B 23/147* (2006.01)

(52) U.S. Cl.
CPC .......... *B25B 21/008* (2013.01); *B25B 23/147* (2013.01); *B25F 5/001* (2013.01)

(58) Field of Classification Search
CPC .... B25F 5/00; B25F 5/001; B25F 5/02; B25B 21/00; B25B 21/02; B25B 21/023
(Continued)

(56) References Cited

U.S. PATENT DOCUMENTS 5,563,482 A 10/1996 Shaw et al.
8,460,153 B2 6/2013 Rudolph et al.
(Continued)

FOREIGN PATENT DOCUMENTS

CN 1695899 A 11/2005
JP 2004271236 A 9/2004
(Continued)

OTHER PUBLICATIONS

Amendment and Response filed on Dec. 21, 2021 in related U.S. Appl. No. 16/722,595.
(Continued)

*Primary Examiner* — Jacob A Smith
(74) *Attorney, Agent, or Firm* — J-TEK LAW PLLC; Jeffrey D. Tekanic; Scott T. Wakeman

(57) ABSTRACT

A rotary tool includes a motor having an axis of rotation extending in a forward-rearward direction of the rotary tool. A grip part is located below the axis of rotation in an up-down direction that is perpendicular to the forward-rearward direction. A planet gear is configured to be driven by the motor. An internal gear meshes with the planet gear and is movable in the forward-rearward direction to change a speed. A sun gear meshes with the planet gear, and an output shaft is configured to be rotationally driven by the sun gear. A sensor is configured to detect the forward-rearward movement of the internal gear, the sensor being disposed downward of the sun gear in the up-down direction.

16 Claims, 12 Drawing Sheets

(58) Field of Classification Search
USPC ............................................ 173/2, 217, 170
See application file for complete search history.

(56) References Cited

U.S. PATENT DOCUMENTS

| | | | | |
|---|---|---|---|---|
| RE46,827 | E | 5/2018 | Rudolph et al. | |
| 2003/0196824 | A1 | 10/2003 | Gass et al. | |
| 2004/0131887 | A1 | 7/2004 | Ao et al. | |
| 2005/0121209 | A1 | 6/2005 | Shimizu et al. | |
| 2005/0263305 | A1 | 12/2005 | Shimizu et al. | |
| 2005/0279197 | A1 | 12/2005 | Wottreng et al. | |
| 2007/0084613 | A1 | 4/2007 | Zhang et al. | |
| 2008/0314157 | A1 | 12/2008 | Cioto et al. | |
| 2010/0089600 | A1 | 4/2010 | Borinato et al. | |
| 2011/0152029 | A1 | 6/2011 | Rudolph et al. | |
| 2011/0203821 | A1 | 8/2011 | Puzio et al. | |
| 2012/0010043 | A1 | 1/2012 | Inagaki et al. | |
| 2012/0169256 | A1* | 7/2012 | Suda | B25B 21/00 318/17 |
| 2013/0126202 | A1* | 5/2013 | Oomori | B25B 21/00 173/217 |
| 2013/0269961 | A1* | 10/2013 | Lim | B25F 5/001 173/1 |
| 2013/0327552 | A1 | 12/2013 | Lovelass et al. | |
| 2013/0331994 | A1 | 12/2013 | Ng et al. | |
| 2014/0015383 | A1* | 1/2014 | Kokinelis | H02P 31/00 310/68 A |
| 2014/0124229 | A1 | 5/2014 | Takahashi et al. | |
| 2014/0284070 | A1 | 9/2014 | Ng et al. | |
| 2016/0046012 | A1 | 2/2016 | Kierspe et al. | |
| 2016/0256213 | A1 | 9/2016 | Kust et al. | |
| 2016/0378097 | A1 | 12/2016 | Crescenti | |
| 2017/0120208 | A1 | 5/2017 | Kolar et al. | |
| 2017/0136599 | A1 | 5/2017 | Aoki | |
| 2017/0157753 | A1* | 6/2017 | Nagasaka | B23B 45/00 |
| 2018/0021931 | A1 | 1/2018 | Abe et al. | |
| 2018/0318999 | A1 | 11/2018 | Lovelass et al. | |
| 2020/0223038 | A1 | 7/2020 | Araki et al. | |
| 2021/0039231 | A1 | 2/2021 | Araki et al. | |
| 2021/0078146 | A1 | 3/2021 | Araki et al. | |

FOREIGN PATENT DOCUMENTS

| | | | |
|---|---|---|---|
| JP | 2005324264 | A | 11/2005 |
| JP | 2006205274 | A | 8/2006 |
| JP | 3130851 | U | 4/2007 |
| JP | 2010149251 | A | 7/2010 |
| JP | 2011230272 | A | 11/2011 |
| JP | 2012030347 | A | 2/2012 |
| JP | 2012139800 | A | 7/2012 |
| JP | 2013066948 | A | 4/2013 |
| JP | 2013094864 | A | 5/2013 |
| JP | 2013255987 | A | 12/2013 |
| JP | 2014136299 | A | 7/2014 |
| JP | 2015229223 | A | 12/2015 |
| JP | 2017100259 | A | 6/2017 |
| JP | 2017127916 | A | 7/2017 |
| JP | 2019054728 | A | 4/2019 |
| WO | 2016121458 | A1 | 8/2016 |

OTHER PUBLICATIONS

Amendment and Response filed on May 20, 2022, in related U.S. Appl. No. 17/015,812.
English translation of Search Report dated Jun. 15, 2022 in related Japanese application No. 2019-002817.
Instruction Manual for Makita's Cordless Combination Hammer XRH08, XRH10 and XRH11 dated Feb. 8, 2018.
Instruction Manual for Makita's Cordless Hammer Driver Drill XPH12 dated Mar. 24, 2016.
Instruction Manual for Makita's Cordless Random Orbit Polisher XOP02 dated Dec. 26, 2018.
Interview Summary dated May 5, 2022, in related U.S. Appl. No. 17/015,812.
Japanese Office Action dated Jun. 28, 2022 in related Japanese application No. 2019-002817, and machine translation thereof.
Notice of Allowance dated Mar. 17, 2022, in related U.S. Appl. No. 16/722,595, and allowed claims 1, 5-17 and 22-34.
Office Action from the Japanese Patent Office dispatched Feb. 14, 2023 in related Japanese application No. 2019-44798, and machine translation thereof.
Office Action from the Japanese Patent Office dispatched Oct. 8, 2022 in related Japanese application No. 2019-144799, and machine translation thereof.
Office Action from the Japanese Patent Office dispatched Sep. 13, 2022 in related Japanese application No. 2019-002817, and translation thereof.
Office Action from the United States Patent Office dated Feb. 28, 2022 in related U.S. Appl. No. 17/015,812, including examined claims 1-20.
Office Action from the United States Patent Office dated Nov. 1, 2022 in related U.S. Appl. No. 17/015,812, including examined claims 1-14, 17-19, and 21-23.
Office Action from the United States Patent Office dated Oct. 25, 2022 in related U.S. Appl. No. 16/935,758, including examined claims 1-3, and 13-27.
Unpublished U.S. Appl. No. 17/015,812, first named inventor: Yuta Araki, filed Sep. 9, 2020.

* cited by examiner

DRIVER-DRILL

CROSS-REFERENCE

The present application is a continuation of U.S. Ser. No. 16/935,758 filed on Jul. 22, 2020, now pending, which claims priority to Japanese patent application serial number 2019-144798 filed on Aug. 6, 2019 and to Japanese patent application serial number 2019-144799 filed on Aug. 6, 2019, the contents of all of which are incorporated fully herein by reference.

TECHNICAL FIELD

The present invention relates to a driver-drill that is selectively operable in either a low-speed mode or a high-speed mode.

BACKGROUND ART

Some known driver-drills and hammer driver-drills comprise a speed-change mechanism that makes it possible to change the rotational speed range of a spindle, which is an output shaft, in two ranges, namely a low speed (high torque) range or low-speed mode (e.g., 0-500 revolutions per minute) and a high speed (low torque) range or high-speed mode (e.g., 0-2000 revolutions per minute). As an example of such a speed change mechanism, a structure is disclosed in Japanese Laid-open Patent Publication 2019-54728, in which the speed change is effected by providing a second-stage internal gear, which is used in a planetary-gear, speed-reducing mechanism, such that the second-stage internal gear is rotatable as well as movable forward and rearward in an axial direction of the spindle, and by sliding the second-stage internal gear forward or rearward by manipulating (pushing) a speed change lever operably connected to the second-stage internal gear. In the high-speed mode, a second-stage speed reduction is omitted by virtue of the internal gear being slid to a position at which it meshes with a first-stage carrier and rotates integrally therewith. In the low-speed mode, the second-stage speed reduction functions owing to the second-stage internal gear being axially slid (by sliding the speed change lever) to a position at which the second-stage internal gear meshes with a coupling ring inside a housing of the driver-drill, which causes rotation of the second-stage internal gear relative to the housing to be blocked (restricted).

In addition, the hammer driver-drill of the above-noted JP 2019-54728 provides three user-selectable action modes, namely a hammer drilling mode, a drilling mode, and a screwdriving mode (clutch mode). In the screwdriving mode, the selection of the clutch actuation torque (fastening torque) is effected by manually rotating a clutch ring (adjusting ring) to change the axial length of a coil spring that presses a rotatable internal gear. Therefore, when the selected clutch actuation torque (fastening torque) is applied to the spindle during the screwdriving operation, the mechanical clutch will be actuated (i.e. slip will occur), and the internal gear will idle so that transmission of rotation from the motor to the spindle is interrupted.

Finally, in addition to mechanical clutch mechanisms that utilize a coil spring to perform the clutch operation, so called "electronic clutches" are also known in which a controller monitors the output torque (motor current, rotational speed, or the like) of a motor, and the controller stops the rotation of the motor when the output torque becomes a prescribed value or greater. The user can select the prescribed value of the output torque within a range of possible values.

SUMMARY OF THE INVENTION

To set the desired "clutch-actuation torque" or fastening torque (fastening torque upper limit) for use in a known driver-drill having either a mechanical type clutch or an electronic type "clutch" (i.e. controller that stops rotation of the motor in response to a prescribed torque being reached), typically a manipulatable member (manually rotatable structure), such as a clutch ring or "adjusting ring" mounted on the housing adjacent to the chuck, is manually rotated to the desired setting step number (level or graduation), which is depicted on the manipulatable member. For example, some known driver-drills provide twenty-one step numbers or graduations to provide twenty-one different levels of fastening torque.

However, because the range of the settable step numbers is the same regardless of whether the driver-drill is being operated in the high-speed mode (range) or in the low-speed mode (range), it may be problematic that, even when the low-speed mode has been selected using the speed change lever, only the clutch-actuation torques (fastening torques) suited for the high-speed mode (high speed range) can be selected. In this case, the driver-drill cannot be used in a manner such that the clutch-actuation torques set in the low-speed mode are higher than the clutch-actuation torques in the high-speed mode.

If a mechanical-type clutch is used, regardless of whether the driver-drill is operating in the high speed range or in the low speed range, the clutch-actuation torques that are settable by the coil spring are always the same.

On the other hand, if an electronic clutch is used, it is necessary to electrically detect whether the driver-drill has been set to operate in the screwdriving mode. In addition, the gear ratio is higher (different) in the low speed operating range than in the high speed operating range owing to the functioning of the second-stage internal gear. Therefore, unless the gear ratio is detected to determine whether the speed-reducing transmission is currently set for low speed operation or high speed operation, differences in the clutch-actuation torques (fastening torques) will adversely arise to the extent of the difference in the gear ratios. Accordingly, to detect whether or not the screwdriving mode has been manually selected as well as to detect whether the high-speed mode or the low-speed mode has been manually selected, it is conceivable to provide one or more sensors, which detect(s) position changes of an action-mode changing ring, a speed change lever, an adjusting ring, etc., in the vicinities thereof. However, if one or more sensors are added, the overall size of the housing may have to increase in the radial direction, in the up-down direction, etc., which may make it difficult to design a compact driver-drill.

It is therefore one non-limiting object of the present teachings to provide a driver-drill that enables selection of clutch-actuation torques (fastening torques) in the low speed operation range (low-speed mode) that are, e.g., higher than the clutch-actuation torques (fastening torques) in the high speed operation range (high-speed mode) while also enabling speed changes to be easily selected.

In addition or in the alternative, it is another non-limiting object of the present teaching to provide a compact technology for detecting whether a rotary tool, e.g., a driver-drill, is operating in a screwdriving mode (clutch mode) as well as to detect the operating speed range (the "speed mode"), even in embodiments that utilize an "electronic clutch".

Therefore, in a first aspect of the present teachings, a driver-drill comprises:

a motor;

an output shaft, which is rotationally driven by the rotation of the motor;

a speed change mechanism, which is provided between the motor and the output shaft and is capable of changing the rotational speed of the output shaft between a low-speed mode and a high-speed mode;

a controlling means or controller, which stops the rotation of the motor when a torque applied to the output shaft reaches a prescribed clutch-actuation torque (fastening torque); and a torque-specifying means, which is capable of specifying, to the controlling means, the setting of the clutch-actuation torque within a prescribed high-low range;

wherein, in the controlling means, a relationship between clutch-actuation torques and each value in the high-low range is set such that, in a first range in which the values are low, changes in the clutch-actuation torques are the same in the low-speed mode and in the high-speed mode and such that, in a second range outside of the first range, the clutch-actuation torques in the low-speed mode are higher than in the high-speed mode.

A rising slope of the clutch-actuation torque in the low-speed mode may be set in the controlling means such that the rising slope is steeper in the second range than in the first range in which the values are low.

In addition or in the alternative, in the second range that is outside of the first range in which the values are low, by making it possible to specify the values in the high-low range only in the low-speed mode, the clutch-actuation torques in the low-speed mode is higher than the clutch-actuation torques in the high-speed mode in the second range.

In a second aspect of the present teachings, a driver-drill comprises:

a motor;

an output shaft, which is rotationally driven by the rotation of the motor;

a speed change mechanism, which is provided between the motor and the output shaft and is capable of changing the rotational speed of the output shaft between a low-speed mode and a high-speed mode;

a controlling means or controller, which stops the rotation of the motor when a torque applied to the output shaft reaches a prescribed clutch-actuation torque; and a torque-specifying means, which is capable of specifying, to the controlling means, the setting of the clutch-actuation torque within a prescribed high-low range;

wherein:

in the low-speed mode, first torque-setting step numbers are settable as the high-low range;

in the high-speed mode, second torque-setting step numbers that are the same as or smaller than the first torque-setting step numbers are settable as the high-low range;

in a range in which the torque-setting step numbers are small, changes in the clutch-actuation torques in the low-speed mode and the high-speed mode are each set to be the same; and the clutch-actuation torque of a maximum step number of the first torque-setting step numbers is set to be larger than the clutch-actuation torque of a maximum step number of the second torque-setting step numbers.

The second torque-setting step numbers may be smaller than the first torque-setting step numbers; and in the low-speed mode, a slope of the clutch-actuation torques in the range of the second torque-setting step numbers may be set to be shallower than the slope of the clutch-actuation torques from after the second torque-setting step numbers to the interval of the first torque-setting step numbers.

In addition or in the alternative, the second torque-setting step numbers again may be smaller than the first torque-setting step numbers; however, in the low-speed mode, a slope of the clutch-actuation torques in the range of the second torque-setting step numbers may be set to be the same as the slope of the clutch-actuation torques from after the second torque-setting step numbers to the interval of the first torque-setting step numbers.

In addition or in the alternative, the second torque-setting step numbers again may be the same as the first torque-setting step numbers; and in the range in which the torque-setting step numbers are large, the clutch-actuation torques may be set such that the difference in the changes in the clutch-actuation torques differ between the low-speed mode and the high-speed mode.

In addition or in the alternative, in the high-speed mode, the slope of the clutch-actuation torques in the range in which the torque-setting step numbers are large and the slope of the clutch-actuation torques in the range in which the torque-setting step numbers are small may be the same; and in the low-speed mode, the clutch-actuation torques may be set such that the slope of the clutch-actuation torques in the range in which the torque-setting step numbers are large is steeper than the slope of the clutch-actuation torques in the range in which the torque-setting step numbers are small.

In addition or in the alternative, in the high-speed mode, the slope of the clutch-actuation torques in the range in which the torque-setting step numbers are large may be set to zero; and in the low-speed mode, the clutch-actuation torques may be set such that the slope of the clutch-actuation torques in the range in which the torque-setting step numbers are large and the slope of the clutch-actuation torques in the range in which the torque-setting step numbers are small are the same.

In a third aspect of the present teachings, a driver-drill comprises:

a motor;

an output shaft, which is rotationally driven by the rotation of the motor;

a speed change mechanism, which is provided between the motor and the output shaft and is capable of changing the rotational speed of the output shaft between a low-speed mode and a high-speed mode;

a controlling means or controller, which stops the rotation of the motor when a torque applied to the output shaft reaches a prescribed clutch-actuation torque; and a torque-specifying means, which is capable of specifying, to the controlling means, the setting of the clutch-actuation torque within a prescribed high-low range;

wherein:

in the low-speed mode, first torque-setting step numbers are settable as the high-low range;

in the high-speed mode, the first torque-setting step numbers are settable as the high-low range; and over the entire range of the first torque-setting step numbers, the clutch-actuation torques in the low-speed mode are set to be larger than the clutch-actuation torques in the high-speed mode.

The clutch-actuation torque of a minimum step number of the torque-setting step numbers in the low-speed mode may be set such that it is the same as the clutch-actuation torque of a maximum step number of the torque-setting step numbers in the high-speed mode.

In addition or in the alternative, the clutch-actuation torques of the minimum step numbers of the torque-setting step numbers in the low-speed mode and the high-speed mode may be the same; and the clutch-actuation torques may be set such that, when the torque-setting step numbers become large, the difference in the clutch-actuation torques thereof becomes large.

In any of the preceding aspects and further embodiments, the driver-drill may further comprise:

- a planet gear, which is driven by the motor;
- a speed change internal gear, which meshes with the planet gear and is movable forward and rearward in an axial direction; and
- a sun gear, which meshes with the planet gear;
- wherein:
- the output shaft is rotationally driven by the speed change mechanism; and
- a sensor, which is configured to detect forward-rearward movement of the speed change internal gear, is disposed downward of the sun gear in the radial direction.

The detection of the forward-rearward movement of the speed change internal gear may be performed by the sensor detecting a detected part provided on a speed change member that manipulates the speed change internal gear by moving it forward and rearward.

In further embodiments, it is possible that:

- the detected part is a permanent magnet;
- the sensor is a magnetic sensor; and
- a gear case, which is made of polymer (resin), is disposed between the permanent magnet and the magnetic sensor.

In any of the preceding aspects and further embodiments, the driver-drill may further comprise:

- a controller, which controls the motor;
- wherein:
- the magnetic sensor is connected to the controller via a connector; and
- the controller is configured to modify control of the motor in accordance with the detection performed by the magnetic sensor.

In any of the preceding aspects and further embodiments, the driver-drill may have:

- at least two selectable action modes including a drilling mode, in which the rotation of the output shaft is maintained regardless of the torque, and a screwdriving mode, in which the rotation of the output shaft is cut off at the prescribed clutch-actuation torque; and
- a sensor for detecting which of the two action modes has been selected by the user, and a detected part, the sensor and detected part being disposed in the radial direction of the output shaft.

The detected part may be provided directly or indirectly on a manually-rotatable mode-changing member, which is configured to change the action mode, and the sensor may detect movement of the detected part as the mode-changing member is manually rotated.

In addition to the two above-noted action modes, a hammer drilling mode may also selectable; and the sensor may detect the drilling mode and the hammer drilling mode as one action mode and detect the screwdriving mode as another action mode. This sensor may be a magnetic sensor that is connected to the controller via a connector; and the controller is configured to modify control of the motor in accordance with the detection performed by the magnetic sensor.

According to at least some aspects of the present teachings, in a low-speed mode, it is possible to select a clutch-actuation torque that is higher than clutch-actuation torques in a high-speed mode.

According to at least some aspects of the present teachings, even if an electronic clutch is used, a screwdriving mode and a speed change mode are detectable with a compact configuration.

DETAILED DESCRIPTION OF EMBODIMENTS OF THE INVENTION

Embodiments of the present invention will be explained below, with reference to the drawings.

Figure 1:
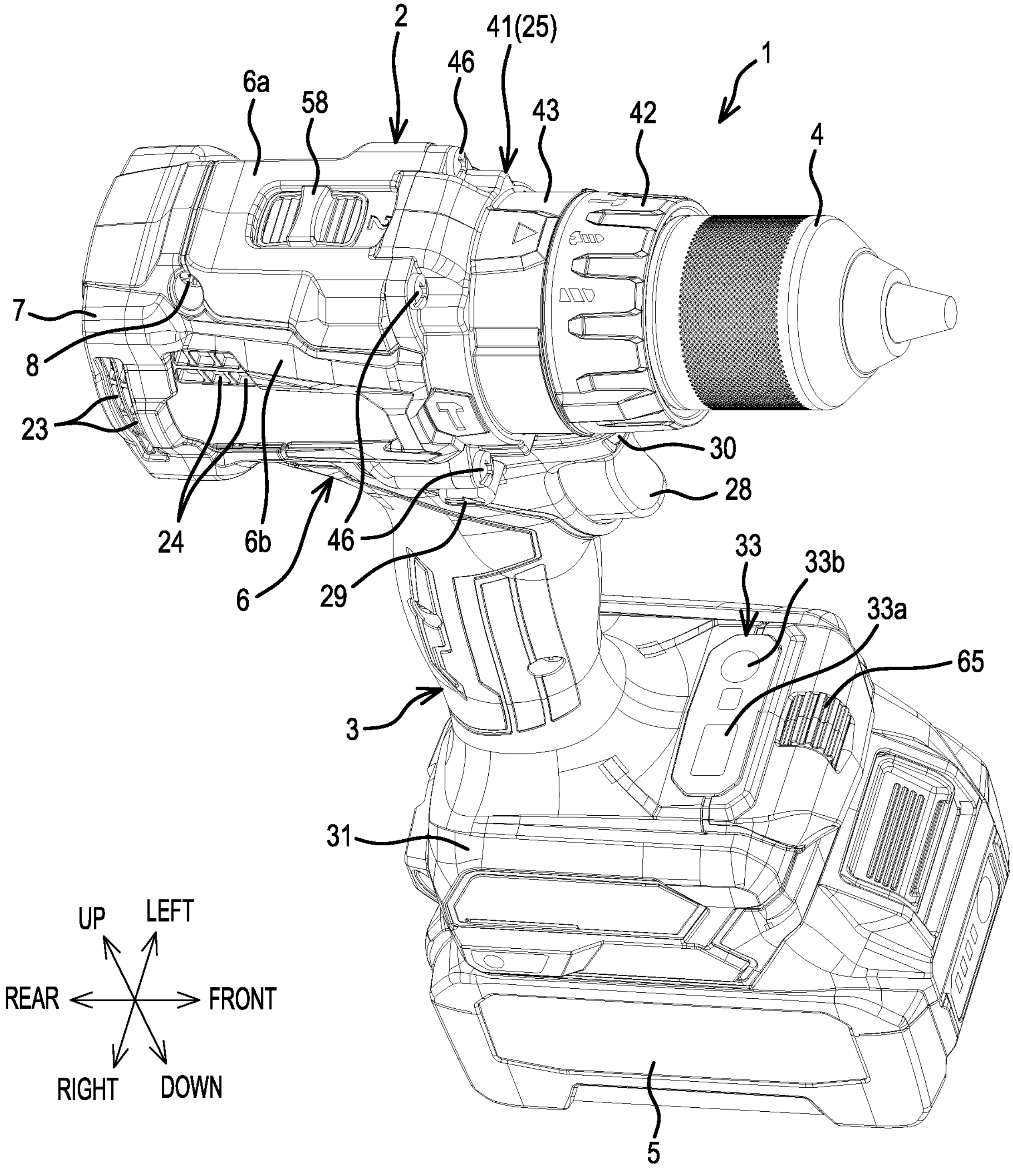
FIG. 1 is an oblique view of a hammer driver-drill according to one exemplary embodiment of the present teachings.
Figure 2:
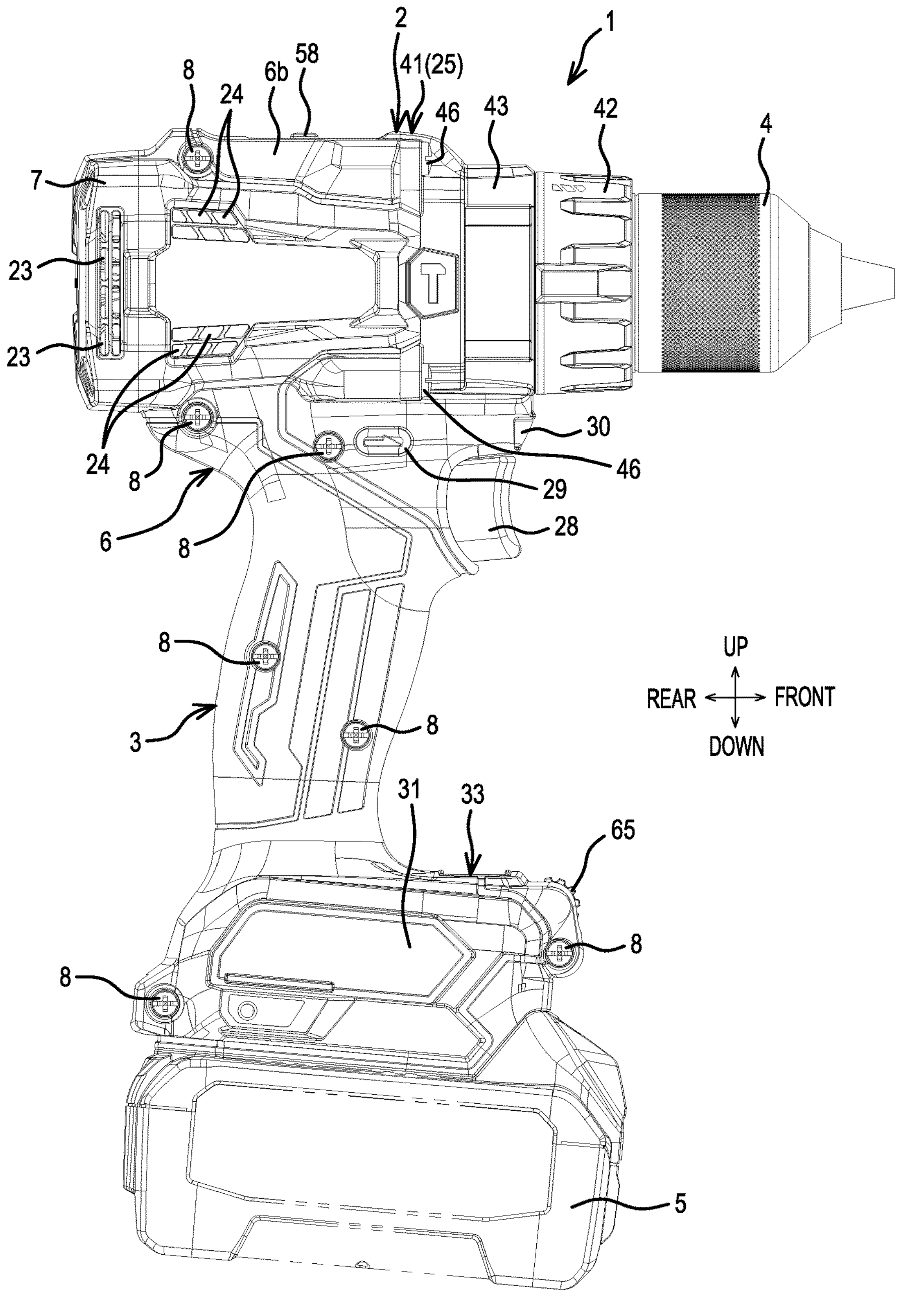
FIG. 2 is a side view of the hammer driver-drill.
Figure 3:
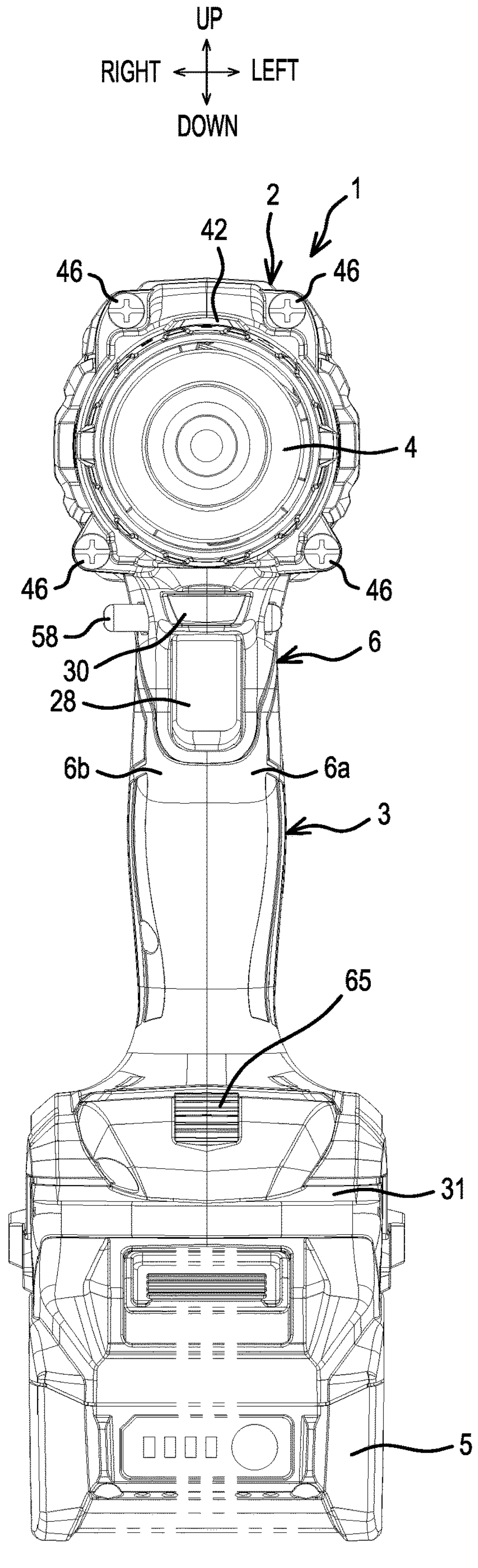
FIG. 3 is a front view of the hammer driver-drill.
Figure 4:
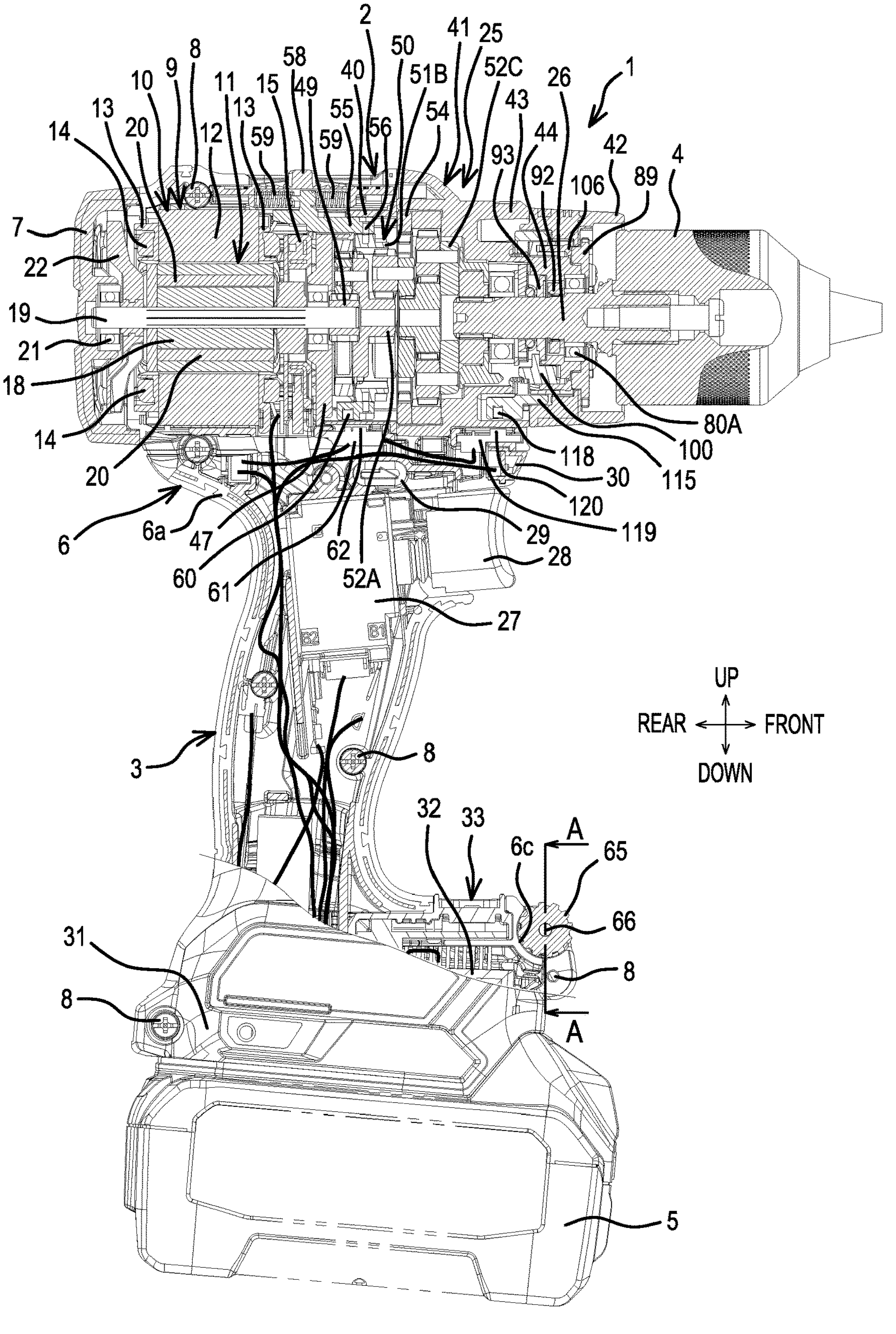
FIG. 4 is a center, longitudinal, cross-sectional view of the hammer driver-drill.

FIG. 1 is an oblique view of an exemplary hammer driver-drill 1 of the present teachings, which serves as an example of a rotary tool and a driver-drill; FIG. 2 is a side view thereof; FIG. 3 is a front view thereof and FIG. 4 is a center, longitudinal, cross-sectional view thereof.

Overall Explanation of Hammer Driver-Drill

The exemplary hammer driver-drill 1 comprises a main body 2 and a handle 3. The main body 2 extends in a front-rear direction. The handle 3 protrudes obliquely, such as perpendicularly, from a lower side of the main body 2. The main body 2 and the handle 3 have a T shape when viewed from either the left or the right direction. A drill chuck 4 is provided on a front end of the main body 2. The end portion of the drill chuck 4 is configured to chuck (hold) a bit, such as a screwdriver bit or a drill bit.

A battery pack 5, which constitutes a power supply, is mounted on a lower end of the handle 3. A housing of the hammer driver-drill 1 comprises a main-body housing 6 and a rear cover 7. A rear-half portion of the main body 2, which has a tube shape, and the handle 3 are provided on the main-body housing 6 in a coupled manner. The rear cover 7 has a cap shape. The rear cover 7 is assembled, from the rear by screws (not shown), onto a rear portion of the main-body housing 6. The main-body housing 6 is formed by left and right half (split) housings 6*a*, 6*b* that are fixed to one another using a plurality of screws 8 extending in a left-right direction that is perpendicular to a longitudinal or axial direction of the main-body housing 6.

Figure 5:
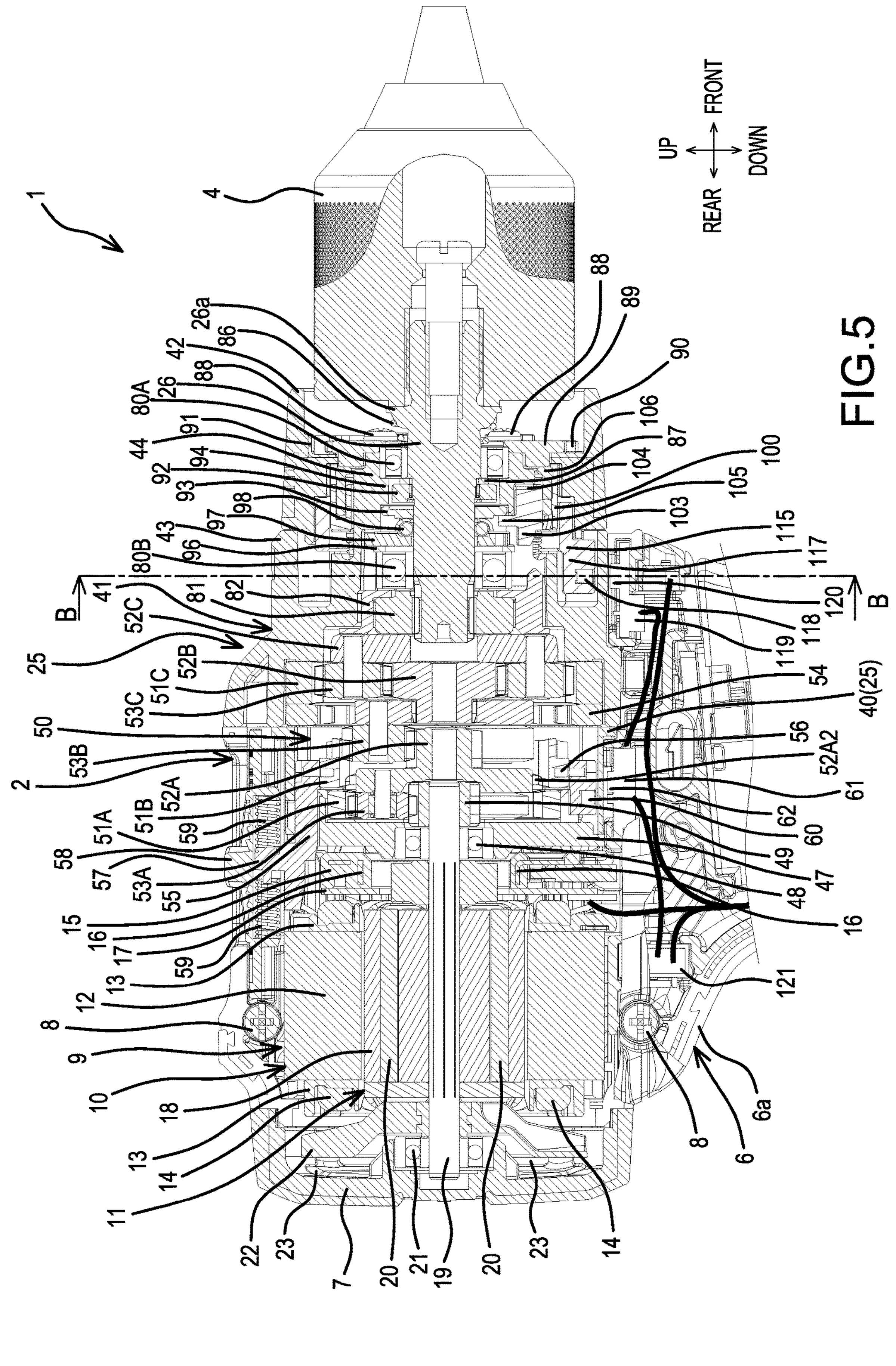
FIG. 5 is an enlarged view of a main-body portion of the hammer driver-drill.

As shown also in FIG. 5, an inner-rotor type brushless motor 9 is housed in a rear portion of the interior of the main body 2. The brushless motor 9 has a a rotor 11, which is disposed inward of a stator 10. The stator 10 comprises a stator core 12, front and rear insulators 13, and a plurality of coils 14. The stator core 12 is composed of laminated steel sheets. The front and rear insulators 13 are respectively held on the front and rear of the stator core 12. The coils 14 are wound on the front and rear insulators 13 and on projections (ribs) that extend radially inward from the interior surface of the stator core 12. A connecting member 15 is fixed to the front-side insulator 13 and comprises three terminal fittings (fusing terminals) 16. Each terminal fitting 16 is fused to the coil(s) 14 of a corresponding phase, whereby a three-phase connection is formed. Lead wires are connected to the terminal fittings 16. The lead wires are connected to a controller (controlling means) 32, which is further described below. In addition, a sensor circuit board 17 is mounted between the front-side insulator 13 and the connecting member 15. One or more rotation-detection devices is (are) installed on the sensor circuit board 17 and is (are) capable of detecting the magnetic fields of permanent magnets 20, which are described below.

The rotor 11 comprises a rotor core 18 and a plurality of the permanent magnets 20. A rotary shaft 19 is fixed at (in) the axial center of the rotor core 18. The permanent magnets 20 are respectively embedded in axially-extending through holes defined in the rotor core 18. A rear end of the rotary shaft 19 is axially supported by a bearing 21 that is held by the rear cover 7. A fan 22 is disposed on the forward side of the bearing 21 and on the rearward side of the rotor core 18. The fan 22 is fixed to the rotary shaft 19. A right portion and a left portion of the rear cover 7 each has a plurality of air-exhaust ports 23 defined therein. A right portion and a left portion of the main-body housing 6 rightward and leftward of the stator 10 each has a plurality of air-suction ports 24 defined therein (FIG. 2).

A gear assembly 25 is assembled (mounted) forward of the brushless motor 9. The gear assembly 25 comprises a spindle 26 that protrudes forward from a second gear case 41, which is further described below. The drill chuck 4 is mounted on a front end of the spindle 26. A switch 27 is housed in an upper portion of the handle 3 downward of the gear assembly 25. A trigger 28 is connected to the forward side of the switch 27. A forward/reverse-changing button (reversing switch lever) 29, which changes the rotational direction of the brushless motor 9, is provided upward of the switch 27. A light 30, which illuminates forward of the drill chuck 4, is provided forward of the forward/reverse-changing button 29. The light 30 comprises one or more LEDs.

A battery-mount part 31 is formed on (at) a lower end of the handle 3. The battery pack 5 is mounted on the battery-mount part 31 by being slid from the front. A terminal block, which is not shown, is provided on the battery-mount part 31. The battery pack 5 is electrically connected to the terminal block. The controller 32 is housed, upward of the terminal block, in the interior of the battery-mount part 31. The controller 32 comprises a control circuit board. A microcontroller for controlling the brushless motor 9, switching devices, and related circuit elements are installed on the control circuit board.

An operation-and-display panel (switch panel) 33 is provided on an upper side of the controller 32. The operation-and-display panel 33 comprises a display part 33*a* for displaying the currently-set clutch-actuation torque (fastening torque) of an "electronic clutch", which is further described below. In addition, a manipulatable part (button and switch) 33*b* for manually initiating the clutch-actuation torque process for the electronic clutch is provided adjacent to the display part 33*a*. That is, when the manipulatable part 33*b* is manipulated (e.g., pressed), the clutch-actuation torque becomes settable (changeable). In this initiated state, the numeral of the display part 33*a* is incremented or decremented by manually rotating a dial 65, which is further described below. When a prescribed time after the manipulation (pressing) of the manipulatable part 33*b* has elapsed, the clutch-actuation torque process is terminated by the controller 32, whereby the numeral on the display part 33*a* can no longer be incremented or decremented, even if the dial 65 is rotated.

A lamp part, which is capable of displaying the light of an LED, is disposed between the display part 33*a* and the manipulatable part 33*b*. The LED of the lamp part flashes ON and OFF in the state in which the above-described clutch-actuation torque is settable (changeable) so that the user knows that the clutch-actuation torque setting process is currently possible. In addition, the controller 32 is configured to turn ON the LED of the lamp part when the electronic clutch has been actuated (i.e. the motor rotation has been stopped owing to the current-set clutch-actuation torque (fastening torque) having been reached).

The upper surface of the battery-mount part 31, which includes the operation-and-display panel 33, is upwardly sloped in the forward direction. Because the tilt is higher in the front, a user can easily see the operation-and-display panel 33 from rearward of the handle 3.

Figure 11:
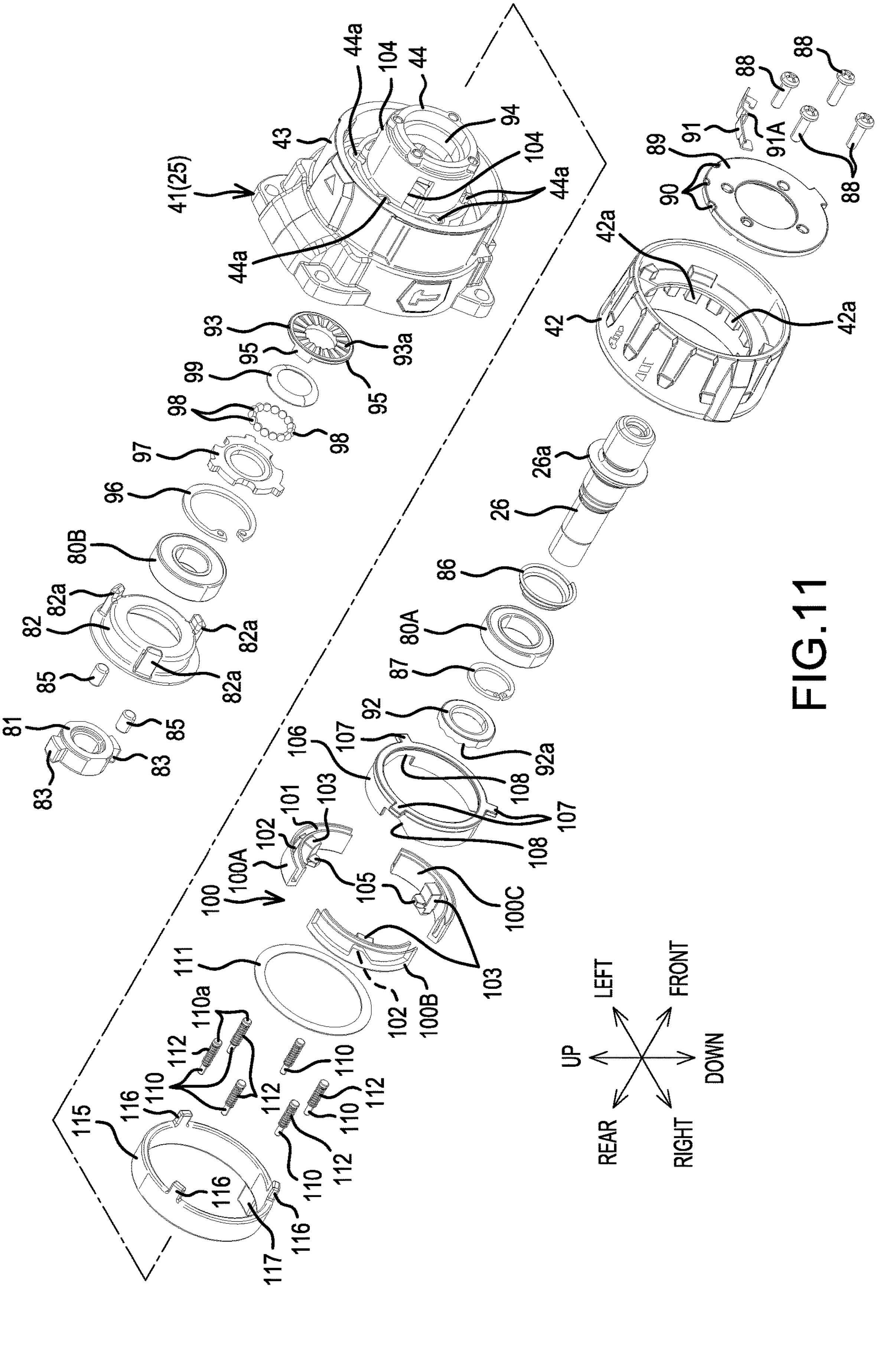
FIG. 11 is an exploded, oblique view of portion of the hammer driver-drill showing an action-mode changing mechanism.

The gear assembly 25 comprises a tube-shaped first gear case 40, the above-mentioned tube-shaped second gear case 41, and a mode-changing ring (action mode changing ring) 42. The second gear case 41 is assembled to (mounted on) the front side of the first gear case 40. The mode-changing ring 42 is assembled to (mounted on) the front side of the second gear case 41. The mode-changing ring 42 and the first gear case 40 are made of polymer (resin). The second gear case 41 is made of aluminum or an aluminum alloy. As shown in FIG. 11, the second gear case 41 has a double-tube shape and comprises a large-diameter tube part 43, which is on its outer side, and a small-diameter tube part 44, which is on its inner side and is longer than the large-diameter tube part 43. The large-diameter tube part 43 and the small-diameter tube part 44 are concentric. The first gear case 40 is joined, by a plurality of screws (not shown) from the rear, to the large-diameter tube part 43. In addition, a rear end of the first gear case 40 is closed up by a bracket plate 47.

The gear assembly 25 is fixed to the main-body housing 6 by virtue of the second gear case 41 being screwed onto the main-body housing 6 by a plurality of screws 46 (FIGS. 1, 3) from the rear. The front end of the rotary shaft 19 passes through the bracket plate 47. The bracket plate 47 has a bearing 48. A front portion of the rotary shaft 19 is rotatably supported by the bearing 48. A pinion 49 is fixed to a front end of the rotary shaft 19. It is noted that a coupling ring 54 is held inside the large-diameter tube part 43 of the second gear case 41. A gear part 54A (FIG. 6) is formed on an inner side of the coupling ring 54.

A speed-reducing mechanism 50 is housed in the interior of the gear assembly 25. As shown also in FIG. 6, the speed-reducing mechanism 50 comprises a first-stage internal gear 51A, a second-stage internal gear 51B, a third-stage internal gear 51C, three first-stage planet gears 53A, three second-stage planet gears 53B, three third-stage planet gears 53C, a first-stage carrier 52A, a second-stage carrier 52B, and a third-stage carrier 52C.

The three first-stage planet gears 53A mesh with the pinion 49 and the first-stage internal gear 51A. The first-stage carrier 52A supports the three first-stage planet gears 53A. A first-stage sun gear 52A1 is formed on a front portion of the first-stage carrier 52A. In addition, a first-stage gear part 52A2 is formed on the outer circumference of the rear portion of the first-stage carrier 52A.

The three second-stage planet gears 53B mesh with the first-stage sun gear 52A1 and the second-stage internal gear 51B. Inside the first gear case 40, the second-stage internal gear 51B is movable in the front-rear direction relative to the housing 6. The second-stage carrier 52B supports the three second-stage planet gears 53B. A second-stage sun gear 52B1 is provided on the front portion of the second-stage carrier 52B. It is noted that the second-stage internal gear 51B is capable of meshing with the gear part 54A of the coupling ring 54 when it is disposed at its advanced (forwardmost) position.

The three third-stage planet gears 53C mesh with the second-stage sun gear 52B1 and the third internal gear 51C. The third-stage carrier 52C supports the three third-stage planet gears 53C.

Explanation of Speed Change Mechanism

A speed change ring 55 is externally mounted on a rear-half portion of the second-stage internal gear 51B. The speed change ring 55 is movable forward and rearward relative to the housing 6 while being blocked from rotating relative to the first gear case 40. The second-stage internal gear 51B and the speed change ring 55 are integrally joined (operably coupled) in the front-rear direction by a plurality of coupling pins 56.

A coupling piece 57 is provided, integrally with the speed change ring 55, such that it protrudes upward. The coupling piece 57 is coupled to a speed change lever 58 via front and rear coil springs 59. Owing to this configuration, the speed change lever 58 is slidable forward and rearward on the upper surface of the main-body housing 6.

When the speed change lever 58 is manually moved to its forward (advanced) position, the coupling piece 57 (and the speed change ring 55) also move forward relative to the main-body housing 6. When the speed change ring 55 moves forward, the second-stage internal gear 51B also moves forward relative to the main-body housing 6.

The speed change mechanism is configured by the above-described structure.

With this speed change mechanism, when the speed change lever 58 is manually slid rearward, the speed change ring 55 retreats (moves rearward) owing to the rearward movement of the coupling piece 57. In so doing, as shown in FIG. 5, the second-stage internal gear 51B, integrally with the speed change ring 55, meshes with the second-stage gear part 52A2 while maintaining its meshing with the second-stage planet gears 53B. Thereby, a high-speed mode (speed ‘2’) results, in which a second-stage speed reduction is omitted.

Figure 6:
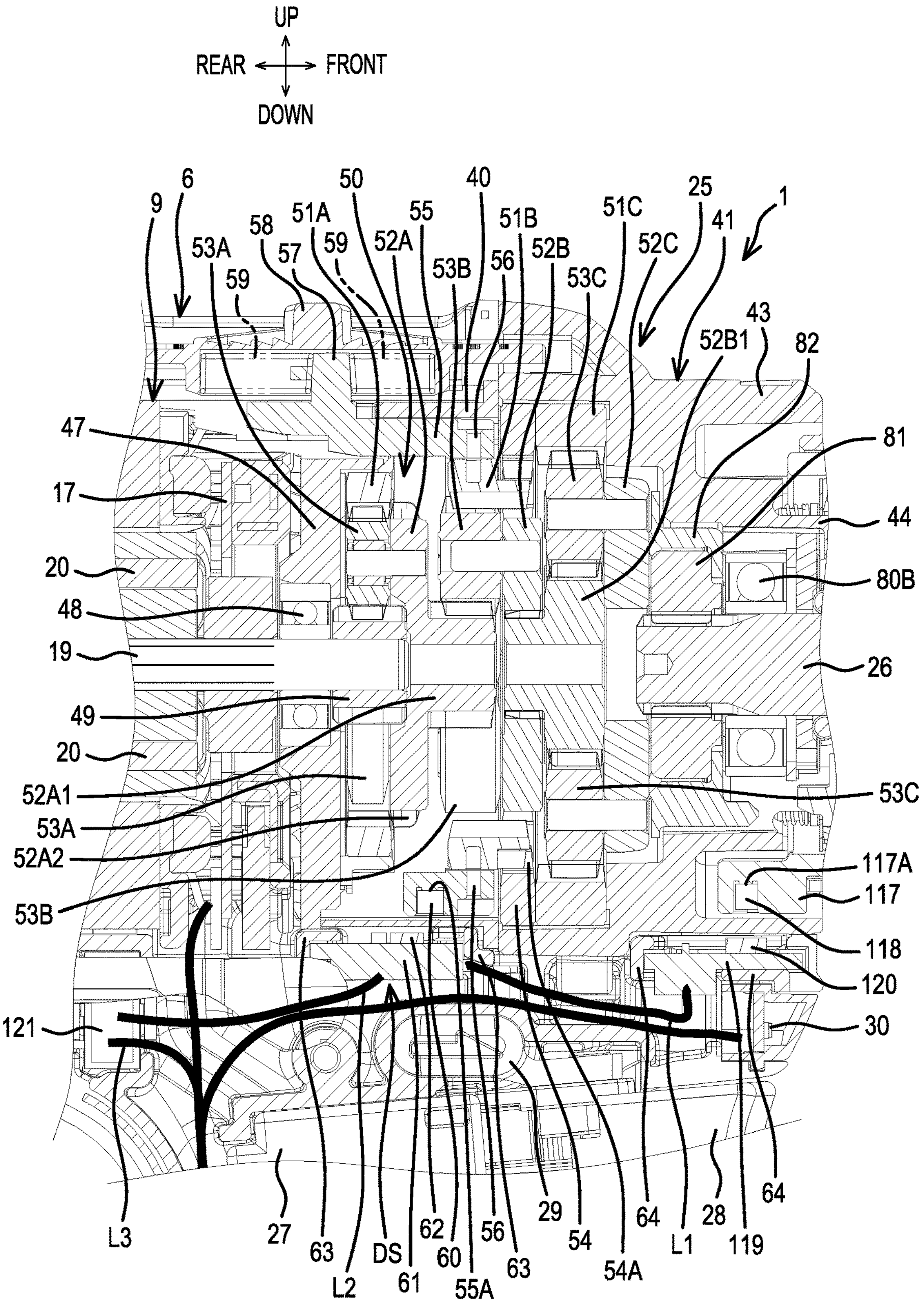
FIG. 6 is an enlarged view of a section of the hammer driver-drill shown in FIG. 5 that contains a speed change mechanism.

Conversely, when the speed change lever 58 is slid forward, as shown in FIG. 6, the speed change ring 55 is moved forward. When the speed change ring 55 moves forward, the second-stage internal gear 51B moves forward. By virtue of the second-stage internal gear 51B moving forward, the meshing with the second-stage gear 52A2 is disengaged. In so doing, the second-stage internal gear 51B meshes with the gear part 54A of the coupling ring 54 while maintaining its meshing with the second-stage planet gears 53B and thereby is rotationally restricted. Thereby, a low-speed mode (speed ‘1’) results, in which the second-stage speed reduction functions.

A hollow part 55A is formed in a lower portion of the speed change ring 55. A magnet 60 (permanent magnet) is held by the hollow part 55A. It is noted that the magnet 60 is disposed in the interior of the first gear case 40 and on the upward side of a lower-portion inner surface of the first gear case 40. A speed-and-position detection board 61, on which a magnetic sensor 62 (e.g., a Hall integrated circuit) is installed on an upper surface, is disposed on the lower side of the first gear case 40. The speed-and-position detection board 61 is supported in the front-rear direction and the left-right direction by ribs 63, which are formed on the main-body housing 6. Changes in the magnetic field of the magnet 60, which slides forward and rearward together with the speed change ring 55, are detected by the magnetic sensor 62. A detection signal generated by the magnetic sensor 62 is output to the controller 32 via the speed-and-position detection board 61. Based on this detection signal, the controller 32 determines the front-rear position of the speed change ring 55, that is, whether the high-speed mode or the low-speed mode has been selected by the user.

The controller 32 acquires the value of the current flowing to the coils 14 and, using the rotation-detection device(s) of the sensor circuit board 17, acquires the rotational speed of the rotor 11. The output torque is estimated based on the electrical-current value and the rotational speed. If the value of the estimated output torque is the clutch-actuation torque or greater (described below), then the electronic clutch function is performed. More specifically, the “electronic clutch” means that the controller 32 stops the rotation of the brushless motor 9, which stops the rotation of the spindle 26, when the currently-set clutch-actuation torque (fastening torque) has been reached. It is noted that the stopping of the rotation may be performed by simply stopping the supply of electrical current to the coils 14, although it is also possible to apply an electronic and/or mechanical brake to stop the rotation of the motor 9 more quickly. When actuating the electronic clutch, the controller 32 compensates, based on the high-speed/low-speed mode determination result obtained from the speed-and-position detection board 61, for the difference in the gear ratios such that there is at least one point, preferably a plurality of points, in each of the high-speed mode and the low-speed mode at which the clutch-actuation torque is the same.

Explanation of Clutch-Actuation Torque (Fastening Torque)

As used herein, the terms “clutch-actuation torque” and “fastening torque” are intended to be synonymous and mean the user-settable upper limit of the torque applied to the spindle 26 during a particular fastening (e.g., screwdriving or bolt tightening) operation. In driver-drills having a mechanical clutch, the “clutch-actuation torque” or the “fastening torque” is the torque at which the mechanical clutch begins to slip, so that the rotation of the motor is no longer transmitted to the spindle (i.e. the motor continues to rotate (idles) without driving the spindle). As was noted in the background section above, the clutch-actuation torque (fastening torque) is adjusted (set) by changing the axial length of a coil spring that presses plates, which operably couple the gear transmission to the spindle, so that the mechanical clutch slips when the clutch-actuation torque (fastening torque), which is set by the user manually rotating a clutch ring (adjusting ring) that changes the axial length of the coil spring, is reached. On the other hand, in the present embodiment, an "electronic clutch" is implemented, which means that the controller 32 is programmed to stop the rotation of the motor 9 when the controller 32 determines that the currently-set clutch-actuation torque (fastening torque) has been reached for the particular fastening operation. In other words, there is no mechanical clutch (e.g., two plates pressed together by an adjustable coil spring) in the present embodiment, which enables the driver-drill to be make more compact owing to the fact that no mechanical parts for implementing the clutch function are present. Rather, the "electronic clutch" of the present embodiment may be implemented, e.g., by a current sensor that determines the momentary current being supplied to the motor 9, a rotation speed sensor that determines the momentary rotational speed of the rotary shaft 19 of the motor 9, a sensor that determines whether the driver-drill is in the high-speed mode or the low-speed mode (which determines the gear ratio of the speed reducing mechanism 50) and the controller 32 that is programmed to calculate the momentary torque being applied to the spindle 26 based upon the momentary current, the momentary rotational speed and the state of the speed-reducing mechanism 50. In response to a determination that the momentary torque being applied to the spindle 26 has reached the currently-set clutch-actuation torque (fastening torque), the controller 32 cuts off (interrupts) the supply of current to the motor 9, thereby stopping rotation of the motor 9.

Figure 7:
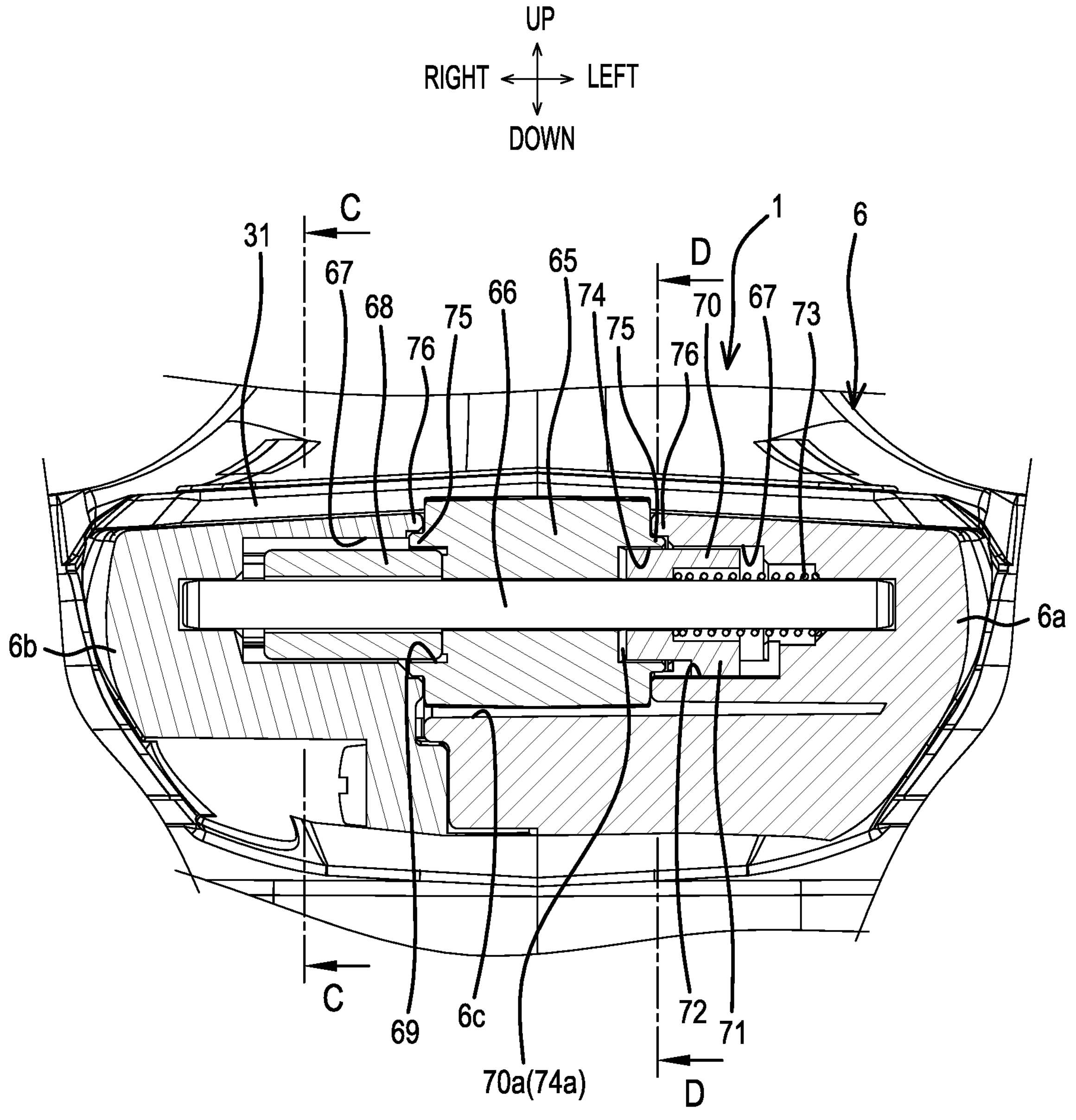
FIG. 7 is an enlarged, cross-sectional view taken along line A-A in FIG. 4.

In the present embodiment, the user can set the clutch-actuation torque (fastening torque) by first pressing the button 33*b* to initiate the clutch-actuation torque setting process (which will also cause the adjacent lamp part to flash) and then by manually rotating the dial 65, which is provided on the front end of the battery-mount part 31. As shown in FIG. 7, a rod 66 is held, forward of the controller 32 and oriented in the left-right direction, by the half housings 6*a*, 6*b*. The rod 66 passes through the dial 65. The dial 65 is supported by the rod 66 such that the dial 65 is rotatable by 360° or greater in both the forward and reverse rotational directions. The dial 65 has a tubular body and the outer circumference thereof has a concave-convex shape (i.e. a plurality of alternating grooves and ridges) extending in the axial direction. The front side and the upper side of the dial 65 are exposed on the upper side of the battery-mount part 31. As shown in FIG. 4, a hollow 6*c*, which has an arcuate shape and opposes a circumferential surface of the dial 65, is formed on an outer surface of the main-body housing 6 and is hidden by the dial 65.

Figure 8:
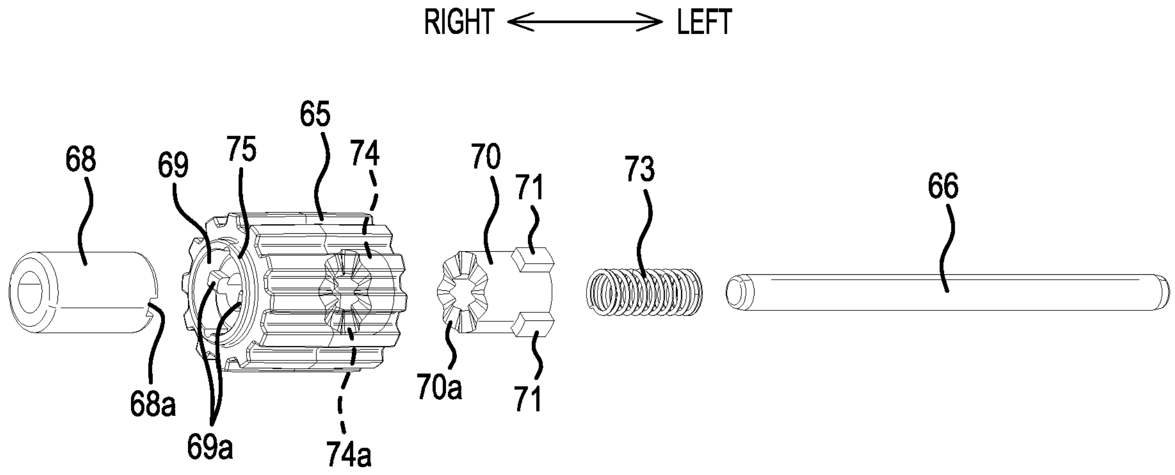
FIG. 8 is an exploded, oblique view of a dial portion.

Both the left and right ends of the rod 66 are held by support recesses 67, which are respectively formed on opposing surfaces of the half housings 6*a*, 6*b*. A tubular magnet 68 is disposed on the right side of the dial 65, and partially within the dial as can be seen in FIG. 7. The rod 66 passes through the tubular magnet 68. It is noted that, in FIGS. 7 and 8, the left side with respect to the driver-drill is shown on the right side of the drawing, and the right side with respect to the driver-drill is shown on the left side of the drawing, as can be understood from the directional arrows in FIGS. 7 and 8. Referring now to FIG. 8, a left portion of the tubular magnet 68 is disposed on an inner-circumference side of a right-side recess 69, which is provided on a right-end surface of the dial 65. The tubular magnet 68 has a notch 68*a* that engages with a projection 69*a*, which surrounds the right-side recess 69. When the notch 68*a* is engaged with the projection 69*a*, the tubular magnet 68 is fixed, using a bonding agent, to the dial 65 at a position at which a portion of the tubular magnet 68 is offset from the dial 65 in the axial direction.

The rod 66 passes through a tube-shaped cam 70 that is disposed on the left side of the dial 65. The cam 70 is provided such that it is movable in the left-right direction relative to the rod 66. Two ridges 71 are provided, oriented in the axial direction of the rod 66, on an outer circumference of the cam 70. As can be seen in FIG. 7, the support recesses 67 have two grooves 72 (only one groove 72 is shown in FIG. 7) extending in the left-right direction. The two ridges 71 are respectively engaged with the two grooves 72 in the left-right direction and are thereby rotationally locked such that the cam 70 is blocked from rotating relative to the half housing 6*a*.

On the left side of the cam 70, the rod 66 passes through a coil spring 73. When the cam 70 is being held in a rotationally locked manner by the support recesses 67, the coil spring 73 biases the cam 70 rightward. Owing to this bias, the cam 70 is inserted into a left-side recess 74, which is provided on a left-end surface of the dial 65. A cam surface 70*a* is formed on a right portion of the cam 70. A cam surface 74*a* is formed on a left portion of the left-side recessed part 74. The cam surface 70*a* and the cam surface 74*a* make contact owing to the biasing force of the coil spring 73. Thereby, when the dial 65 is manually rotated, the dial 65 produces a click sensation by virtue of the cam surfaces 70*a*, 74*a* between the rotating dial 65 and the non-rotatable cam 70 engaging with one another (i.e. the rotating cam surface 74*a* slides over the stationary cam surface 70*a*, thereby producing sounds as the dial 65 is rotated).

Figure 9A:
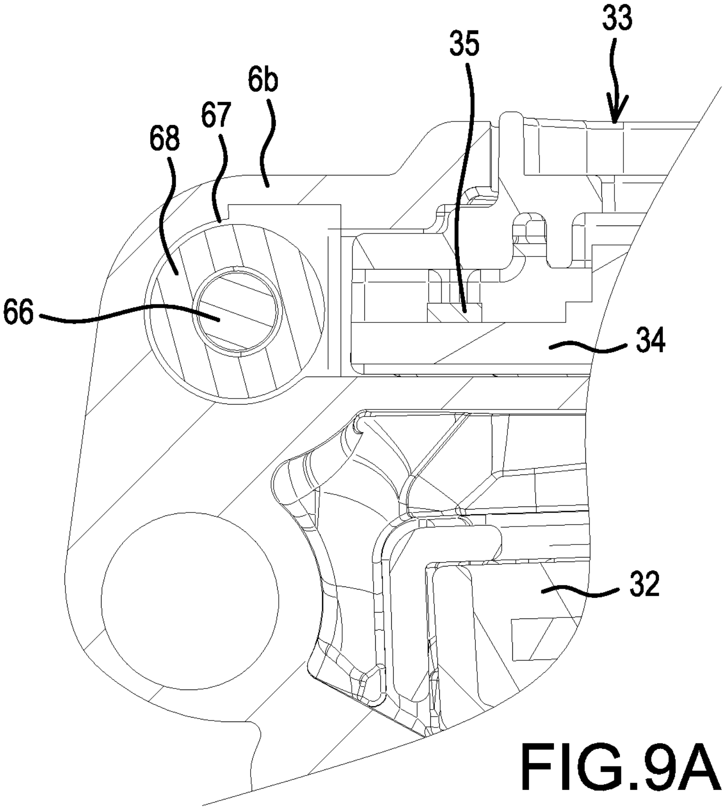
FIG. 9A is an enlarged, cross-sectional view taken along line C-C in FIG. 7.

As shown in FIG. 9A, the controller 32 comprises a subcontrol board 34 that extends to the front, rear, left, and right rearward of the dial 65. The subcontrol board 34 is electrically connected to the control circuit board of the controller 32 and the operation-and-display panel 33. A magnetic sensor 35, such as a Hall-effect device, is provided, at a position at which it opposes the tubular magnet 68, on the upper surface of the subcontrol board 34. The magnetic sensor 35 detects changes in the magnetic field caused by the rotation of the tubular magnet 68. The controller 32 acquires the rotational direction and the rotational angle of the dial 65 based on the detected changes in the magnetic field. Thus, by manually rotating the dial 65, the user can set the desired clutch-actuation torque (fastening torque) for actuating the "electronic clutch" in the next fastening operation as a clutch-setting step number, which is determined by the controller 32 based on the detected rotational direction and the detected rotational angle of the tubular magnet 68 connected in a rotationally-fixed manner to the dial 65. Using the clutch-actuation torque set in this manner, the controller 32 will stop the rotation of the brushless motor 9 when the controller 32 determines that the torque being applied at the spindle 9 (calculated as described above) has reached the currently-set clutch-actuation torque.

FIG. 10A to FIG. 10F respectively show six different examples of clutch-actuation torque relationships that can be provided (set) by the controller 32 to determine the currently-set clutch-actuation torque (fastening torque) from the clutch-setting step number that was determined, as described above, from the user's manual rotation of the dial 65. In each graph, the abscissa represents the clutch-setting step number (1, 2, 3, . . . ), and the ordinate represents the clutch-actuation torques (N·m) that the controller 32 will use to determine when to stop rotation of the motor 9. The clutch-actuation torques increase upward along the axis, but specific numerical values are not indicated.

With reference to FIG. 10A to FIG. 10F, the clutch-actuation torques in the high-speed mode are indicated by a dashed line, and the clutch-actuation torques in the low-speed mode are indicated by a solid line. That is, in some of the examples, a particular clutch-setting step number will correspond to different clutch-actuation torques (upper limits of the fastening torque) depending upon whether the user has selected the high-speed mode (higher range of motor speeds) or the low-speed mode (lower range of motor speeds), as was described above.

Figure 10A:
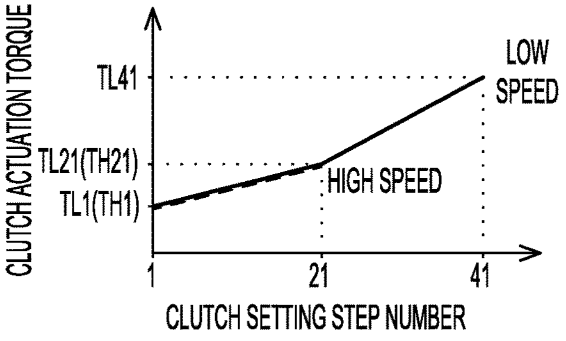
FIGS. 10A-10F are explanatory diagrams that show various examples for setting clutch actuation torques using an electronic clutch.

Thus, in the example shown in FIG. 10A, the dashed line in the graph indicates the relationship between the clutch-setting step numbers and the clutch-actuation torques when the driver-drill 1 is being operated in the high-speed mode. On the other hand, the solid line in the graph indicates the relationship between the clutch-setting step numbers and the clutch-actuation torques when the driver-drill 1 is being operated in the low-speed mode. In the other graphs from FIG. 10B to FIG. 10F, too, the dashed line and the solid line respectively correspond to the high-speed mode operation and the low-speed mode operation.

In the example shown in FIG. 10A, the clutch-setting step numbers are determined such that the magnitudes of the clutch-actuation torques in steps 1-21 are the same in both the low-speed mode and the high-speed mode. That is, clutch-actuation torque TL1 in the low speed mode when the clutch-setting step number is 1 is identical to clutch-actuation torque TH1 in the high-speed mode when the clutch-setting step number is 1. In addition, the clutch-actuation torque TL21 in the low speed mode when the clutch-setting step number is 21 is identical to the clutch-actuation torque TH21 in the high speed mode when the clutch-setting step number is 21. The torques are also identical for all of the clutch-setting step numbers therebetween, that is, in the range of 2-20.

In the low-speed mode indicated by the solid line, the clutch-setting step numbers further increase, in the range of steps 22-41, beyond the clutch-setting step numbers that are available in the high-speed mode indicated by the dashed line. That is, in the example of FIG. 10A, a higher range of clutch-actuation torques can be set in the low-speed mode than the range of clutch-actuation torques that is available in the high-speed mode. For example, the clutch-actuation torque TL41 in the low-speed mode when the clutch-setting step number is 41 is greater than the clutch-actuation torque TH21, which is the maximum value of the clutch-actuation torque in the high-speed mode. This embodiment takes advantage of the fact that, when the driver-drill 1 is operated in the low-speed mode, it outputs higher torque than when the driver-drill 1 is operated in the high-speed mode, thereby enabling fastening operations to be performed to a greater fastening torque than is available in the high-speed mode.

In addition, in the example of FIG. 10A, the rising slope of the torque in the range of steps 22-41 in the low-speed mode is set to be greater than the rising slope of the torque in the range of steps 1-21 in the low-speed mode. By utilizing such rising slopes, a high torque becomes selectable even though the clutch step number is 41 in the low-speed mode. Thus, it is noted that the range of clutch-actuation torques (fastening torques) that are settable in the range of steps 21-41 is wider than the range of the clutch-actuation torques (fastening torques) that are settable in the range of steps 1-21. That is, the relation (clutch-actuation torque TL41−clutch-actuation torque TL21)>(clutch-actuation torque TL21−clutch-actuation torque TL1) holds even for the same difference in clutch-setting step numbers, that is, 20 steps. It is noted that the clutch-setting step number, which is currently selected by rotational position of the dial 65, in each mode is displayed on the display part 33*a* of the operation-and-display panel 33.

In the example shown in FIG. 10A, because the clutch-actuation torque in the range of steps 1-21 does not change when the user switches between the low speed mode and the high speed mode, the user does not get confused, i.e. the user will know that driver-drill 1 will apply the same clutch-actuation torque (fastening torque) for steps 1-21 regardless of whether the driver-drill 1 is being operated in the high-speed mode or the low-speed mode. However, when the user requires a higher clutch-actuation torque (i.e. a greater fastening torque) for a particular fastening operation, steps 22-41 in the low speed mode should be used.

Figure 10D:
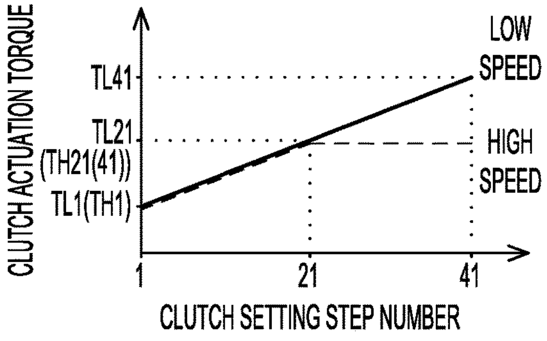
Figure 10B:
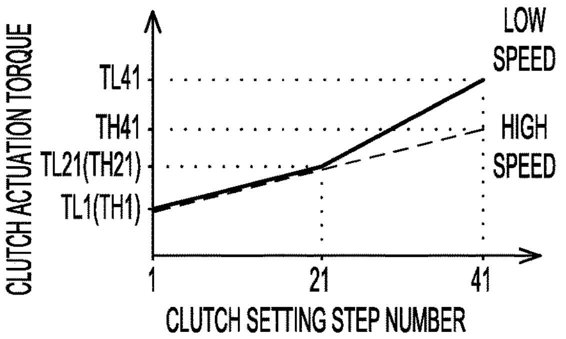

In the example shown in FIG. 10B, the two slopes of the clutch-actuation torques in the range of steps 1-41 in the low-speed mode are the same as the corresponding two slopes in FIG. 10A. In addition, in the example shown in FIG. 10B, the slope of the clutch-actuation torques in the range of steps 1-21 in the high-speed mode is the same as the slope shown in FIG. 10(A). However, in the example shown in FIG. 10B, in the high-speed mode, it is now possible to select steps 22-41 that have the same slope of the clutch-actuation torques in the range of steps 1-21. That is, clutch-actuation torque TL1 and clutch-actuation torque TH1 are the same; in addition, clutch-actuation torque TL21 and clutch-actuation torque TH21 are the same. Furthermore, the relation (TH41-TH21)=(TH21-TH1) holds. Finally, the relation TL41>TH41 also holds owing to the fact that the slope of clutch-actuation torques corresponding to steps 21-41 in the low-speed mode is greater than the slope of clutch-actuation torques corresponding to steps 21-41 in the high-speed mode. Because the slopes corresponding to steps 21-41 in the low-speed mode and the high-speed mode differ, the relation (TL41-TL21)>(TL21-TL1) holds.

Figure 10E:
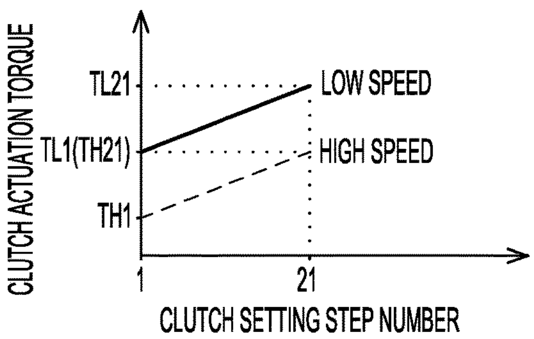
Figure 10C:
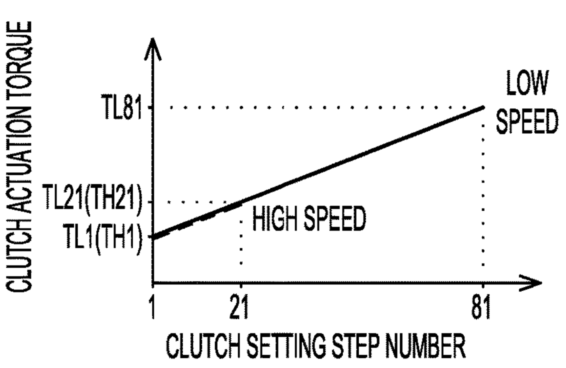

In the example shown in FIG. 10C, in the high-speed mode, the magnitudes of the clutch-actuation torques for steps 1-21 are the same as those in FIG. 10A. In addition, in the example shown in FIG. 10C, in the low-speed mode, the magnitudes of the clutch-actuation torques for steps 1-21 are the same as those in FIG. 10A. However, in the example shown in FIG. 10(C), in the low-speed mode, clutch-setting step numbers over a wider range of steps 22-81 can be further selected with the slope of the clutch-actuation torque remaining constant over that wider range. It is noted that, here, the relations (clutch-actuation torque TL81−clutch-actuation torque TL21)=(clutch-actuation torque TH21−clutch-actuation torque TH1)×3=(clutch-actuation torque TL21−clutch-actuation torque TL1)×3 hold.

However, with the relationships shown in FIGS. 10A and 10C, there are clutch-setting step numbers that can be selected in the low-speed mode that do not exist in the high-speed mode, i.e. steps 22-41 in FIG. 10A and steps 22-81 in FIG. 10C. Consequently, in FIGS. 10A and 10C, a correspondence is conceivable in which clutch-setting step numbers that correspond to both the low-speed mode and the high-speed mode are stored in advance as torque settings to be used when switching between the low-speed mode and the high-speed mode. For example, in FIG. 10A, it is conceivable to perform switching between the low-speed mode and the high-speed mode by creating a one-to-one correspondence between the low-speed steps 22-41 and the high-speed steps 1-21.

In addition, as a separate scheme, a correspondence is also conceivable in which, when switching to high-speed mode operation from a low-speed step number that exceeds the upper limit in the high-speed mode, the setting always returns to the step number of the maximum torque in the high-speed mode. For example, in FIG. 10A, it is conceivable to always set the setting to step 21 in the high-speed mode when switching to the high-speed mode from step 22 or higher in the low-speed mode.

In the example shown in FIG. 10D, the clutch-setting step numbers are determined such that the clutch-actuation torques are the same over the range of steps 1-21 for both the low-speed mode and the high-speed mode. In addition, in the example shown in FIG. 10D, in the low-speed mode, the rising slope in the range of steps 22-41 is the same as the rising slope in the range of steps 1-21. In the high-speed mode, the clutch-actuation torque in the range of steps 21-41 does not change and remains constant starting from step 21. That is, clutch-actuation torque TL21=clutch-actuation torque TH21=clutch-actuation torque TH41.

In addition, in the example shown in FIG. 10E, the torque setting ranges may differ even for the same steps, that is, steps 1-21 in the low-speed mode and steps 1-21 in the high-speed mode. More specifically, in the example shown in FIG. 10E, step 21 in the high-speed mode and step 1 in the low-speed mode correspond to the same clutch-actuation torque, i.e. clutch-actuation torque TL1=clutch-actuation torque TH21. Furthermore, the angle of the rising slope in the range of steps 1-21 is the same for both high speed and low speed, i.e. the relation (TL21−TL1)=(TH21−TH1) holds.

Figure 10F:
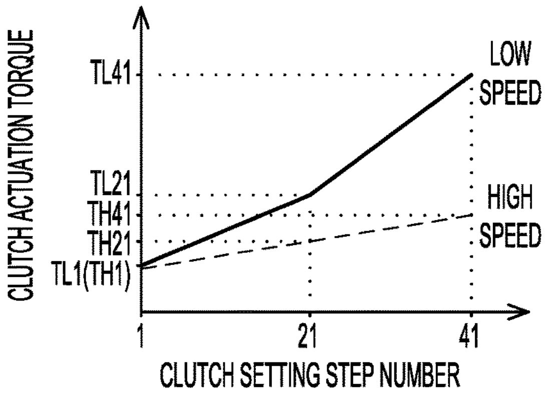

In addition, in the example shown in FIG. 10F, even though the low-speed mode and the high-speed mode each have steps 1-41, their clutch-actuation torque setting ranges differ. In addition, it is also possible to increase the rising slope in the low-speed mode midway and thereby enlarge the torque setting range in the low-speed mode. That is, (clutch-actuation torque TH41−clutch-actuation torque TH21)=(clutch-actuation torque TH21−clutch-actuation torque TH1). In addition, (clutch-actuation torque TL41−clutch-actuation torque TL21)>(clutch-actuation torque TL21−clutch-actuation torque TL1). Naturally, clutch-actuation torque TL41>clutch-actuation torque TH41, clutch-actuation torque TL21>clutch-actuation torque TH21, and clutch-actuation torque TL1=clutch-actuation torque TH1.

Each of the relationships in FIGS. 10A-10F can be implemented in one or more lookup tables (LUTs) stored in the controller 32 that the microprocessor of the controller 32 can access in order to look up the clutch-actuation torque that corresponds to the clutch-setting step number that has been manually selected by the user via the dial 65 and the currently-set operation mode (i.e. high-speed mode or low-speed mode). In the alternative, each of the relationships in FIGS. 10A-10F can be implemented according to an algorithm, in which a function corresponding to the slope(s) of the clutch-actuation torques is stored in the controller 32. In such an embodiment, the controller 32 inputs the clutch-setting step number that has been manually selected by the user via the dial 65 and the currently-set operation mode (i.e. high-speed mode or low-speed mode) into the stored function in order to calculate the corresponding clutch-actuation torque (fastening torque). Although typically the controller 32 will store only one LUT (or one LUT for high-speed mode and one LUT for low-speed mode) or one function, the controller 32 optionally made store two more LUTs (two or more LUTs for high-speed mode and two or more LUTs for low-speed mode) or two or more functions, and the user may then select which LUT(s) or function to use for a particular set of fastening operations. For example and without limitation, in one set of fastening operations, it may be preferable to set the clutch-actuation torques according to the relationships in FIG. 10A, whereas in another set of fastening operations, it may be preferable to set the clutch-actuation torques according to the relationships in FIG. 10F.

Figure 9B:
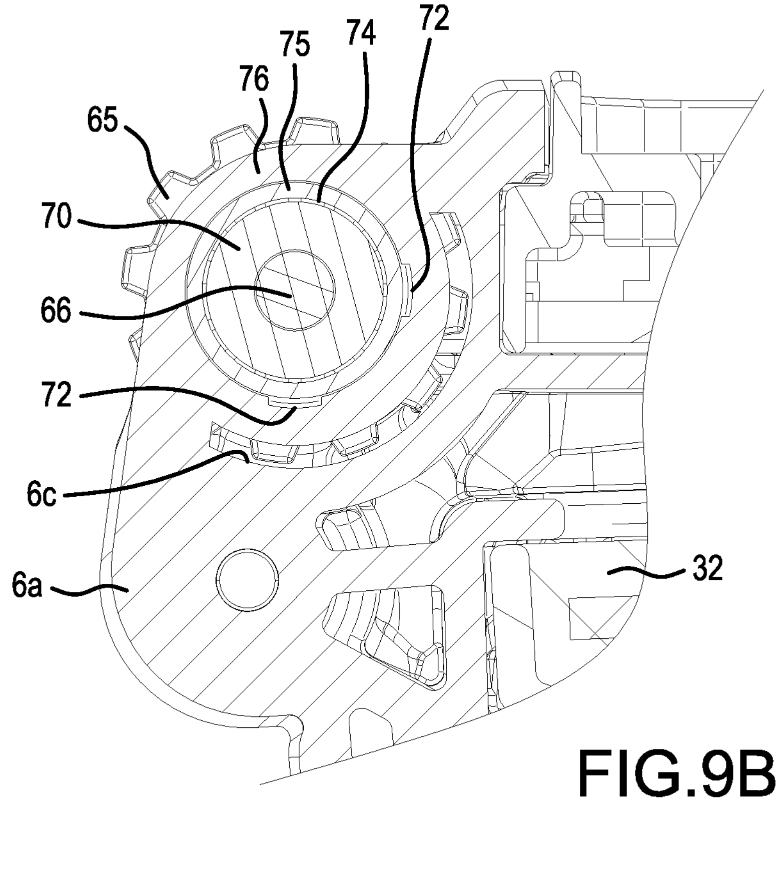
FIG. 9B is an enlarged, cross-sectional view taken along line D-D in FIG. 7.

Returning now to the construction of the dial 65 shown in FIGS. 7-9, small-diameter parts 75 protrude from both the right- and left-end surfaces of the dial 65. Cover parts 76 are provided on open ends of the left and right support recesses 67 of the half housings 6*a*, 6*b*. As shown in FIG. 9B, the cover parts 76 overlap in the radial direction over the entire circumferences of the small-diameter parts 75. Thereby, a labyrinth structure results (i.e. a labyrinth seal defining a tortious path) that, on the left and right of the dial 65, curves twice toward the outer surface of the cam 70 between the half housings 6*a*, 6*b*. Owing to this labyrinth structure, the ingress of dust between the half housings 6*a*, 6*b* and the dial 65 is impeded. Because dust tends not to enter this space between the half housings 6*a*, 6*b* and the dial 65, there is a lower risk that the sliding properties will degrade when the dial 65 is rotated.

In addition, the left-side recess 74 of the dial 65 is formed on the far side of the tip of the corresponding small-diameter part 75. Thereby, the cam 70 is disposed in a manner such that it spans the dial 65 and the half housing 6*a*. Thereby, the ingress of dust between the dial 65 and the cam 70 is impeded. Because dust tends not to enter this space between the dial 65 and the cam 70, there is a lower risk of the cam surface 70*a* and the cam surface 74*a* wearing down.

Explanation of Structure for Changing the Action Mode

The mode-changing ring (action mode changing ring) 42 is rotatably mounted on the small-diameter tube part 44 of the second gear case 41. A hammer drilling mode, a drilling mode, and a screwdriving mode ("clutch mode") are each selectable by manually rotating the mode-changing ring 42. In the hammer drilling mode, the spindle 26 is hammered (repetitively struck) in the axial direction while the spindle 26 rotates. In the drilling mode, only rotation of the spindle 26 alone is performed (i.e. there is no hammering). Furthermore, the electronic clutch is never actuated. In the screwdriving mode (clutch mode), once the clutch-actuation torque set by the dial 65 is reached, the controller 32 stops the rotation of the motor 9 by cutting off (interrupting) the supply of current to the motor 9.

The structure for changing the action mode will now be explained.

The spindle 26 is axially supported by a front bearing 80A and a rear bearing 80B inside the small-diameter tube part 44 of the second gear case 41. A rear end of the spindle 26 is spline connected with a lock cam 81, which integrally rotates in the rotational direction with the third-stage carrier 52C. The spindle 26 is movable forward and rearward in the axial direction relative to the main-body housing 6.

As shown also in FIG. 11, the lock cam 81 is rotatably provided inside a lock ring 82, which has a tube shape. Three tabs 82*a* are formed on the outer side of the lock ring 82 and engage with the small-diameter tube part 44. Thereby, the lock ring 82 is blocked from rotating relative to the small-diameter tube part 44.

A plurality of tabs (not shown) is provided on a front surface of the third-stage carrier 52C. The plurality of tabs engages with a pair of engagement parts 83. Owing to this engagement, rotation of the third-stage carrier 52C is transmitted to the spindle 26. Furthermore, the action mode changing structure is configured such that, when rotating the drill chuck 4 to chuck or de-chuck (release) the bit while the brushless motor 9 is stopped, a pair of wedge pins 85 provided between the tabs meshes between a beveled portion of a side surface of the lock cam 81 and the lock ring 82, and therefore rotation of the spindle 26 becomes locked.

In addition, a flange 26*a* is formed on the forward side of the spindle 26. A coil spring 86 is disposed between the flange 26*a* and the front bearing 80A. The spindle 26 is passed through the coil spring 86. In addition, the spindle 26 is passed through a retaining ring 87 rearward of the front bearing 80A. A first cam 92, which is described below, is fixed, in the rotational direction and the axial direction, to the spindle 26.

Consequently, the spindle 26 is biased forward by the coil spring 86. Owing to this biasing force, the retaining ring 87, together with a first cam, moves to the advanced position at which the first cam makes contact with the front bearing 80A. A disk-shaped retaining plate 89 is fixed from the front by four screws 88 to a front surface of the small-diameter tube part 44. A rear surface of the retaining plate 89 contacts a front surface of the mode-changing ring 42. Thereby, the mode-changing ring 42 does not come off of the small-diameter tube part 44 in the forward direction. A plurality of (three) recesses 90 is formed on (in) an outer circumference of the retaining plate 89. A leaf spring 91 is fixed to a front-end inner surface of the mode-changing ring 42. A protruding part 91A, which extends from an inner-diameter side of the leaf spring 91, elastically latches in one of the recesses 90, thereby generating a click action.

The ring-shaped first cam 92 and a second cam 93 are disposed inside the small-diameter tube part 44 such that the first cam 92 and the second cam 93 are disposed between the front bearing 80A and the rear bearing 80B. The spindle 26 passes through the first cam 92 and the second cam 93. The rear surface of the first cam 92 has a first cam surface 92*a*, which has a plurality of radially projecting teeth. The first cam 92 is secured to the spindle 26 rearward of the retaining ring 87. A front surface of the second cam 93 has a second cam surface 93*a*, which has a plurality of radially projecting teeth. In addition, the spindle 26 passes through the second cam 93 in the state in which a gap is formed between an inner-circumferential surface of the second cam 93 and an outer-circumferential surface of the spindle 26. The second cam 93 is disposed rearward of a step part 94, which has a ring shape and is formed on an inner surface of the small-diameter tube part 44. Three meshing projections 95 are provided, rearward facing, on the outer circumference of a rear surface of the second cam 93. The three meshing projections 95 are disposed equispaced in the circumferential direction.

A receiving ring 97 is disposed on the front side of the rear bearing 80B inside the small-diameter tube part 44. Movement in the axial direction and rotation of the receiving ring 97 relative to the second gear case 41 are restricted (blocked) using a C ring 96. A plurality of steel balls 98 is disposed on a front surface of the receiving ring 97. A ring-shaped receiving washer 99, is disposed on front surfaces of the steel balls 98. The receiving washer 99 makes contact with a rear surface of the second cam 93. The second cam 93 is rotatably held in the state in which forward-rearward movement of the second cam 93 between the step part 94 and the receiving washer 99 is restricted.

A hammer-changing ring 100 is provided inward of the mode-changing ring 42 and outward of the small-diameter tube part 44. The hammer-changing ring 100 has a ring groove 101, which opens forward, around its entire circumference. The hammer-changing ring 100 has a U shape in a section cut in the radial direction. Three cam projections 102 are formed inside the ring groove 101. One side of each of the three cam projections 102 in the circumferential direction is formed as a tilted surface and protrudes toward the forward side. In addition, three restricting projections 103 are formed extending in the front-rear direction on the inner-circumferential surface of the hammer-changing ring 100. The three restricting projections 103 are disposed equispaced in the circumferential direction. The three restricting projections 103 mate with three guide holes 104, which are provided in the small-diameter tube part 44. Thereby, the hammer-changing ring 100 is rotationally restricted (blocked) relative to the small-diameter tube part 44 and is movable only in the front-rear (axial) direction. Three engagement tabs 105 are formed on inner surfaces of the restricting projections 103. The three engagement tabs 105, are engageable with the meshing projections 95 in the circumferential direction. It is noted that the three engagement tabs 105 protrude toward the center of the small-diameter tube part 44 rearward of the second cam 93.

Furthermore, the hammer-changing ring 100 is divided into three segmented bodies 100A-100C, each having an arcuate shape in front view and each comprising one of the cam projections 102, one of the restricting projections 103, and one of the engagement tabs 105.

A cam ring 106, which is inserted into the ring groove 101 from the front, is disposed forward of the hammer-changing ring 100. Three latching projections 107, which protrude in the radial direction, are formed on an outer circumference of the front end of the cam ring 106. A plurality of receiving projections 42*a* is formed on the inner circumference of the mode-changing ring 42. The three latching projections 107 are latched between the plurality of receiving projections 42*a*. Thereby, the mode-changing ring 42 and the cam ring 106 are integrally rotatable. Three cam grooves 108 are formed on a rear-end edge of the cam ring 106. One side of each of the three cam grooves 108 in the circumferential direction is formed as a tilted surface. The three cam projections 102, which are provided inside the ring groove 101 of the hammer-changing ring 100, mate from the front with the three cam grooves 108 at prescribed positions in the circumferential direction.

A washer 111 is disposed rearward of the hammer-changing ring 100. Six pressing rods 110 are disposed rearward of the washer 111. Six receiving holes 44*a* are provided in a base of the small-diameter tube part 44. Rear ends of the pressing rods 110 are inserted with a clearance into the receiving holes 44*a*.

The six pressing rods 110 are disposed equispaced around the circumferential direction of the washer 111. Two of the pressing rods 110 are disposed rearward of the segmented body 100A of the hammer-changing ring 100. Another two of the pressing rods 110 are disposed rearward of the segmented body 100B. Another two of the pressing rods 110 are disposed rearward of the segmented body 100C.

A coil spring 112 is provided on the outer-circumference side of each pressing rod 110. A rear end of each coil spring 112 fits in the corresponding receiving hole 44*a*. In addition, front ends of the coil springs 112 engage with head parts 110*a*, which have large diameters and are provided on front ends of the pressing rods 110.

Thereby, the pressing rods 110 are biased forward by the coil springs 112. The head parts 110*a* press the washer 111 toward the forward side. The washer 111 biases the hammer-changing ring 100 toward the forward side. The hammer-changing ring 100 biases the cam ring 106 forward. Thereby, the cam ring 106 makes contact with the retaining plate 89.

Here, the cam ring 106 is rotatable to prescribed angles. Consequently, the position of the cam ring 106 in the circumferential direction relative to the hammer-changing ring 100 is modifiable.

At the circumferential-direction position of the cam ring 106 where the cam grooves 108 mate with the cam projections 102 inside the ring groove 101, the hammer-changing ring 100 advances (moves forward). At the advanced position of the hammer-changing ring 100, the engagement tabs 105 engage with the meshing projections 95 of the second cam 93. Owing to this engagement, rotation of the second cam 93 is restricted (blocked).

At the circumferential-direction position of the cam ring 106 where the cam grooves 108 separate from the cam projections 102, the hammer-changing ring 100 retreats (moves rearward). At the retreated position of the hammer-changing ring 100, the engagement tabs 105 move rearward. Consequently, the engagement tabs 105 do not engage with the meshing projections 95. Thereby, the rotational restriction of the second cam 93 is released, i.e. the second cam 93 is freely rotatable.

The integrated state of the three segmented bodies 100A-100C of the hammer-changing ring 100 is maintained by the cam ring 106, which is inserted into the ring groove 101. In addition, the integrated state of the three segmented bodies 100A-100C is also maintained in a ring shape by a clutch ring 115, which is externally mounted around the outer sides of the segmented bodies 100A-100C.

The division of the hammer-changing ring 100 into three parts makes it easy to assemble the hammer-changing ring 100 onto the small-diameter tube part 44 from the outer side in the radial direction.

In addition, the hammer-changing ring 100 has a U shape in transverse section, and a rear portion of the cam ring 106 is disposed inside the U shape. Thus, the hammer-changing ring 100 and the cam ring 106 are caused to overlap in the radial direction. Consequently, the dimension of the hammer-changing ring 100 and the cam ring 106 in the axial direction is reduced.

The clutch ring 115 is mated with the inner circumference of the mode-changing ring 42. A plurality of front-side projections 116 is provided on the front portion of the clutch ring 115. The plurality of front-side projections 116 mates with the receiving projections 42*a*. Owing to this engagement, the clutch ring 115 and the mode-changing ring 42 are joined in an integrally rotatable manner.

Protruding parts 117, which extend facing rearward, are formed on a lower surface of the clutch ring 115. Hollow parts 117A are formed on lower surfaces of the protruding parts 117. As shown in FIGS. 5, 6, and 11, magnets 118 (permanent magnets) are embedded in the hollow parts 117A.

A magnetic sensor 120 (e.g., a Hall integrated circuit) is disposed upward of the light 30 on the downward (lower) side of the magnets 118. It is noted that a lower-side portion of the second gear case 41 is disposed between the magnets 118 and the magnetic sensor 120.

The main-body housing 6 has the ribs 64 that support a clutch-detection board 119 in the front-rear direction. The above-described magnetic sensor 120 (e.g., a Hall integrated circuit) is installed on an upper surface of the clutch-detection board 119.

One end of each of the three lead wires (shown in FIG. 6 as lead wires L1 in a bundled state) is connected to the clutch-detection board 119. The three lead wires are a + (plus) wire, a – (minus) wire, and a first signal wire. The first signal wire transmits a signal from the magnetic sensor 120.

In addition, the other end of each of the three lead wires is connected to the speed-and-position detection board 61.

In addition, one end of each of four lead wires (shown in FIG. 6 as lead wire L2 in a bundled state) is connected to the speed-and-position detection board 61. The four lead wires are a + (plus) wire, a – (minus) wire, a first signal wire, and a second signal wire. The first signal wire transmits a signal from the magnetic sensor 120. The second signal wire transmits a signal from the magnetic sensor 62. In addition, the four lead wires are connected to a connector 121 that is disposed downward of the brushless motor 9.

In addition, one end of each of another four lead wires (shown in FIG. 6 as lead wire L3 in a bundled state) is connected to the connector 121. The four lead wires are a + (plus) wire, a – (minus) wire, a first signal wire, and a second signal wire. The first signal wire transmits a signal from the magnetic sensor 120. The second signal wire transmits a signal from the magnetic sensor 62. In addition, the four lead wires are connected to the controller 32.

Owing to the configuration of the lead wires L1-L3 as described above, if the clutch-detection board 119 or the speed-and-position detection board 61 has broken, the connector 121 can be disconnected. After disconnecting the connector 121, a new clutch-detection board 119 or speed-and-position detection board 61 can be substituted. Owing to such a configuration, it is no longer necessary to collectively replace the clutch-detection board 119, the speed-and-position detection board 61, and the controller 32.

The magnets 118 rotate together with manual rotation of the mode-changing ring 42. The magnetic sensor 120 detects changes in the magnetic fields of the rotating magnets 118. The detection signal from the magnetic sensor 120 is output to the controller 32 via the clutch-detection board 119. The controller 32 determines the rotational position of the mode-changing ring 42 based on the detection signal. That is, it is determined whether the user has set (rotated) the action-changing ring 42 to the screwdriving mode, to the hammer drilling mode or to the drilling mode.

Next, the action modes that are selectable by rotating the mode-changing ring 42 will be explained.

First, the hammer drilling mode will be explained. That is, when the mode-changing ring 42 is set to the rotational position where the mode-changing ring 42 is rotated leftmost in front view, because the cam projections 102 mate with the cam grooves 108 of the cam ring 106, the hammer-changing ring 100 is moved forward. Each engagement tab 105 is located between adjacent ones of the meshing projections 95 of the second cam 93. Consequently, the hammer-changing ring 100 restricts (blocks) the rotation of the second cam 93.

In this state, when the user pulls the trigger 28 and the spindle 26 rotates owing to the rotation of the rotor 11, the user presses the bit, which is mounted on the drill chuck 4, against a workpiece. In so doing, the drill chuck 4 moves rearward, and the spindle 26, together with the drill chuck 4, moves rearward. Thereby, the first cam 92, together with the spindle 26, retreats. It is noted that, because the spindle 26 is connected to the lock ring 82 via axially-extending splines, forward-rearward movement of the spindle 26 relative to the lock ring 82 is permitted.

Because the spindle 26 is rotating, the first cam 92 likewise is rotating. The first cam 92 moves rearward, and the state results in which the first cam 92 contacts the second cam 93. Because the second cam 93 is blocked from rotating, the first cam surface 92*a* and the second cam surface 93*a* engage (interact) with one another, i.e. the first cam surface 92 passes over the second cam surface 93 while contacting it. As a result, the bit, which is mounted on the drill chuck 4, is hammered in the forward-rearward direction owing to the cam action of the first and second cams 92, 93 while also rotating. Therefore, the hammer drilling mode is effected.

Figure 12:
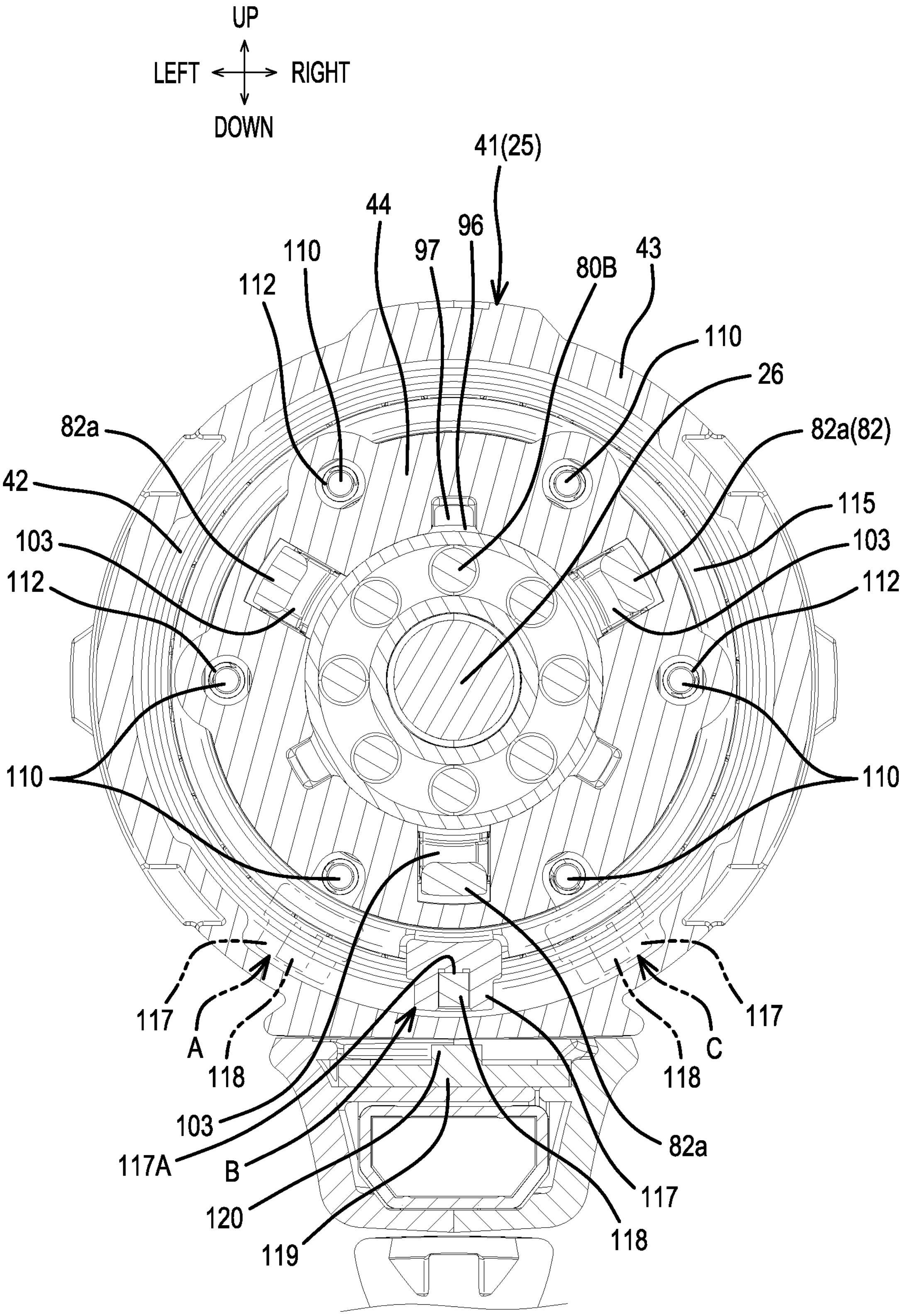
FIG. 12 is an enlarged, cross-sectional view taken along line B-B in FIG. 5.

At this time, as shown by the chain double-dashed lines in FIG. 12, the clutch ring 115 is at rotational position A, where the protruding parts 117 and the magnets 118 are caused to be spaced apart from the magnetic sensor 120 leftward in the circumferential direction. At rotational position A, the controller 32 does not actuate the electronic clutch, regardless of the load (torque) applied to the spindle 26. That is, the supply of electrical current to the coils 14 continues without stopping until the trigger 28 is released.

Next, the screwdriving mode will be explained. That is, as shown in FIG. 1, the mode-changing ring 42 is set to the rotational position at which the mode-changing ring 42 has been rotated counterclockwise approximately 30° in front view from its rotational position in the hammer drilling mode. At this rotational position, with regard to the hammer-changing ring 100, the cam grooves 108 separate from the cam projections 102 as the cam ring 106 rotates clockwise. Consequently, the hammer-changing ring 100 is at the retreated position. Thereby, the engagement tabs 105 are moved rearward from between the meshing projections 95 of the second cam 93. Consequently, the rotational restriction of the second cam 93 of the hammer-changing ring 100 is released, and the second cam 93 becomes rotatable.

At this time, the clutch ring 115 is rotated approximately 30° from the rotational position shown in FIG. 12. The protruding parts 117 and the magnets 118 are disposed as indicated by solid lines in FIG. 12. That is, the magnets 118 are at rotational position B, where the magnets 118 are positioned directly above the magnetic sensor 120. At rotational position B, because the second cam 93 rotates, hammering does not occur even if the first cam surface 92*a* and the second cam surface 93*a* engage one another. That is, the first and second cams 92, 93 will rotate together without generating the cam action (percussive impacts).

In the screwdriving mode, the controller 32 actuates the electronic clutch at the clutch-actuation torque determined based on the step number selected by manually rotating the dial 65, as was explained in detail above. That is, the screwdriving mode is effected, in which the rotation of the brushless motor 9 is stopped at the prescribed (currently-set) clutch-actuation torque.

Next, the drilling mode will be explained. That is, the mode-changing ring 42 is set to the rotational position at which the mode-changing ring 42 is rotated from its position in the screwdriving mode counterclockwise approximately 30° in front view. At this rotational position, the hammer-changing ring 100 remains at the retreated position, at which the hammer-changing ring 100 releases the rotational restriction of the second cam 93. Consequently, hammering does not occur, which is the same as in the screwdriving mode. At this time, as shown by the chain double-dashed lines in FIG. 12, the clutch ring 115 is at rotational position C, at which the protruding parts 117 and the magnets 118 are caused to be spaced apart from the magnetic sensor 120 rightward in the circumferential direction. At rotational position C, the controller 32 does not actuate the electronic clutch regardless of the load (torque) applied to the spindle 26. That is, in the drilling mode, the supply of electrical current to the coils 14 continues without stopping until the user releases the trigger 28.

Explanation of the Operation of the Hammer Driver-Drill

The hammer driver-drill 1 configured as described above may be operated in the following manner. First, the user turns the switch 27 ON by pulling (squeezing) the trigger 28. When the switch 27 has been turned ON, the microcontroller of the controller 32 turns the six switching devices ON and OFF and starts the supply of electrical current to the coils 14. The supply of electrical current to the coils 14 generates magnetic fields in the stator 10. Owing to these magnetic fields, the permanent magnets 20 of the rotor 11 are attracted and repelled and thereby the rotor 11 rotates.

The rotation-detection device of the sensor circuit board 17 outputs a rotation-detection signal, which indicates the positions of the permanent magnets 20. Owing to this output, the rotational state of the rotor 11 is acquired. The microcontroller of the controller 32 controls the ON/OFF state of the switching devices in accordance with the acquired rotational state. By turning the switching devices ON/OFF, an electrical current flows sequentially to the coils 14, each phase in turn, of the stator 10. Thereby, the rotor 11 continues to rotate and, owing to that rotation, the rotary shaft 19 rotates. Owing to the rotation of the rotary shaft 19, the pinion 49 rotates, and the rotation of the pinion 49 rotates the spindle 26 via the speed-reducing mechanism 50. Thereby, it becomes possible to use the hammer driver-drill 1 in the selected action mode with a bit chucked (held) by the drill chuck 4.

At this time, if the hammer drilling mode is selected by the mode-changing ring 42, then the hammer-changing ring 100 is at the advanced position, as described above. Thereby, because rotation of the second cam 93 is restricted (blocked), hammering in the forward-rearward direction occurs by virtue of the first cam 92, which rotates together with the spindle 26, which has been pressed-in and retreated from the workpiece, interfering (interacting) with the second cam 93 and thereby the first and second cam surfaces 92*a*, 93*a* interfering (interacting) with one another. By using this hammering, a hole can be more easily formed in a hard, brittle workpiece.

On the other hand, if the screwdriving mode or the drilling mode is selected by the mode-changing ring 42, then the hammer-changing ring 100 is at the retreated position, as described above. Thereby, because the rotational restriction of the second cam 93 is released (i.e., the second cam 93 is rotatable), the first cam 92, which rotates together with the spindle 26, which has been pressed-in and retreated from the workpiece, rotates together with the second cam 93. That is, hammering does not occur in either the screwdriving mode or the drilling mode.

Furthermore, in the screwdriving mode, the operating speed range, i.e. either the low-speed mode or the high-speed mode, selected via the speed change ring 55 is detected in the speed change mechanism, as described above. Based on this detection result, the controller 32 performs detection using the speed-and-position detection board 61. The rotation of the spindle 26, together with the brushless motor 9, is stopped at the clutch-actuation torque set according to, e.g., one of the examples shown in FIGS. 10A-10F in accordance with the detected motor rotational speed, the detected current currently being supplied to the motor and the current-set gear ratio (which determines the operating speed range of the spindle 26).

Effects of the Arrangement of the Magnetic Sensors in the Embodiment Above

The hammer driver-drill 1 according to the above-described embodiment comprises, in particular, the brushless motor 9 (motor), the second-stage planet gears 53B (planet gears), which are driven by the brushless motor 9, the second-stage internal gear 51B (internal gear), which meshes with the second-stage planet gears 53B and is movable forward and rearward in the axial direction to change the operating speed range of the spindle 26, the first-stage carrier 52A (sun gear), which meshes with the second-stage planet gears 53B and the spindle 26 (output shaft), which is rotationally driven directly by the third-stage carrier 52C and indirectly by the first-stage carrier 52A and the second-stage carrier 52B. In other words, the spindle 26 is operably coupled to the rotational driving force generated by the first-stage carrier 52A. Furthermore, the magnetic sensor 62 (sensor), which is capable of detecting forward-rearward movement of the second-stage internal gear 51B, is disposed downward of the first-stage carrier 52A in the radial direction.

Owing to these configurations, the magnetic sensor 62 (the speed-and-position detection board 61) can be disposed using the space downward of the second-stage internal gear 51B in the radial direction. Thereby, even if an electronic clutch is used, the speed change mode is detectable with a compact configuration.

Here in particular, detection of the forward-rearward movement of the second-stage internal gear 51B is achieved by virtue of the magnetic sensor 62 detecting the magnet 60 (detected part), which is provided on the speed change ring 55 (speed change member) that manipulates the second-stage internal gear 51B by moving it forward and rearward. Thereby, the forward-rearward movement of the second-stage internal gear 51B is detectable with a rational configuration in which the speed change ring 55 is used.

In addition, the magnetic sensor 62 is disposed downward of the first gear case 40. Downward of the first gear case 40 is dead space DS (FIG. 6) inside the main-body housing 6. Because the magnetic sensor 62 is disposed in dead space DS, the main-body housing 6 can be made more compact than embodiments in which the magnetic sensor 62 is placed outside of dead space DS, for example, upward of the main-body housing 6.

In addition, the controller 32, which is provided downward of the switch 27, receives the speed-and-position detection signal from the speed-and-position detection board 61. If the magnetic sensor 62 were to be placed upward of the main-body housing 6, then the lead wires for transmitting signals would adversely become long. That is, the lead wires can be shortened more than in embodiments in which, for example, the magnetic sensor 62 is disposed on the upper side of the first gear case 40.

The magnet 60 is disposed in the interior of the first gear case 40. Consequently, the adherence of iron filings or the like to the magnet 60 is less likely to occur than in embodiments in which the magnet 60 is disposed outside of the first gear case 40. In particular, the first gear case 40 (gear case), which is made of polymer (resin), is disposed between the magnet 60 (permanent magnet) and the magnetic sensor 62. Thereby, the first gear case 40 does not affect the detection performed by the magnetic sensor 62. Furthermore, the magnetic sensor 62 is connected to the controller 32 via the connector 121 that can be easily disconnected; therefore, there is no longer a need to collectively replace the magnetic sensor 62 and the controller 32 in case only one of them is defective.

In addition, the hammer driver-drill 1 according to the above-described embodiment comprises, in particular, the brushless motor 9 (motor) and the spindle 26 (output shaft), which is rotationally driven by the brushless motor 9. In addition, three action modes are selectable, namely: the drilling mode, in which the rotation of the spindle 26 is maintained regardless of the torque that is being applied to the spindle 26 (i.e. until the trigger 28 is released); the screwdriving mode, which interrupts rotation of the spindle 26 at a prescribed (user-set) clutch-actuation torque; and the hammer drilling mode. Furthermore, the magnetic sensor 120 (sensor) and the magnets 118 (detected parts), which are configured to detect which of these three action modes has been selected by the user, are disposed in the radial direction of the spindle 26.

Owing to these configurations, the magnets 118 and the magnetic sensor 120 (the clutch-detection board 119) can be disposed using the space outward of the spindle 26 in the radial direction. Thereby, even if an electronic clutch is used, the screwdriving mode is detectable with a compact configuration.

Here in particular, the magnets 118 are indirectly provided on the mode-changing ring 42 (mode-changing member), which is capable of changing the action mode by being manually rotated, and the magnetic sensor 120 detects the movement of the magnets 118 as the mode-changing ring 42 is manually rotated. Thereby, the screwdriving mode is detectable with a rational configuration in which the mode-changing ring 42 is used.

In embodiments in which the magnetic sensor 120 were to be disposed on the rearward sides of the magnets 118, the length thereof in the front-rear direction would become large. However, because the magnetic sensor 120 is disposed on the downward sides of the magnets 118, compactness in the front-rear direction can be achieved.

In addition to the drilling mode and the screwdriving mode, the hammer drilling mode is also selectable; the magnetic sensor 120 detects the drilling mode and the hammer drilling mode as one action mode and detects the screwdriving mode as another action mode. Thereby, even though there are three action modes, the screwdriving mode can be reliably detected and distinguished from the hammer drilling mode and the drilling mode.

The magnetic sensor 120 is connected to the controller 32 via the connector 121, and the controller 32 can modify control of the brushless motor 9 in accordance with the detection performed by the magnetic sensor 120. Thereby, there is no longer a need to collectively replace the magnetic sensor 120 and the controller 32 in case only one of them becomes defective.

The second gear case 41 (gear case), which is made of aluminum, is disposed between the magnetic sensor 120 and the magnets 118. Thereby, rigidity can be ensured without affecting the detection performed by the magnetic sensor 120.

The magnets 118 (permanent magnets), which serve as the detected parts, are held in the hollow parts 117A, which are formed in the clutch ring 115 (holding member) and are open downward facing. Thereby, the magnets 118 can be disposed at a location at which it is easy for them to be detected.

The light 30, which can be used to illuminate the vicinity of the drill chuck 4, is disposed downward of the magnetic sensor 120, and the trigger 28 is disposed downward of the light 30. Thereby, the work site can be illuminated reliably.

It is noted that, in the above-described embodiment, the magnet and the magnet sensor, which cooperate together to detect forward-rearward movement of the internal gear, and the speed-and-position detection board are disposed downward of the carrier. However, it does not matter even if they are disposed outward in the left-right direction, as long as they are disposed outward in the radial direction. This applies likewise for the magnet sensor and the clutch-detection board that detect the screwdriving mode. However, as long as it is disposed downward as in the above-described embodiment, every detection board fits inside the main-body housing (the handle side), which is downward. Consequently, the main body for providing the detection boards does not become large in the radial direction.

In addition, the clutch ring may be omitted, and the magnets may be provided directly on the mode-changing ring. The step numbers of the speed-reducing mechanism are not limited to those in the above-described embodiments, and the second-stage internal gear that is movable forward and rearward to selected the desired operating speed range for the spindle 26 may have other steps.

Furthermore, detection is not limited to that performed via the magnet and the magnetic sensor. The sensor may be a contact type. If no contact is desired, a sensor, such as a photoelectric type, and a detected part can also be used, as long as detection is possible.

In additional aspects of the above-described embodiment, it is noted that, if the front-rear distance between the speed-and-position detection board and the clutch-detection board becomes small owing to the number of steps of the speed-reducing mechanism, then it is also possible to install the speed-and-position detection sensor and the clutch-detection sensor on one board. In such embodiments, the microcontroller can be installed on that one board. In addition, the plurality of switching devices also can be installed on that one board.

Furthermore, the arrangement of the magnetic sensor in the speed change mechanism is not limited to the hammer driver-drill according to the above-described embodiment and is also applicable to a driver-drill, a drill, or the like, as long as it is a rotary tool that comprises a speed change mechanism. It does not matter even if it is an angle tool.

In addition, the arrangement of the magnetic sensor for detecting the screwdriving mode is also not limited to the hammer driver-drill according to the above-described embodiment and is also applicable even to a driver-drill, an angle tool, or the like that does not comprise a hammer mechanism.

Effects of Setting of the Clutch-Actuation Torque (Fastening Torque) According to the Embodiments Above The hammer driver-drill 1 according to the above-described embodiment comprises, in particular, the brushless motor 9 (motor), the spindle 26 (output shaft), which is rotationally driven by the rotation of the brushless motor 9, the speed change mechanism, which is located between the brushless motor 9 and the spindle 26 and is capable of switching the rotational speed range of the spindle 26 between the low-speed mode and the high-speed mode, the controller 32 (controlling means), which stops the rotation of the brushless motor 9 when the torque applied to the spindle 26 reaches a prescribed (user-set) clutch-actuation torque, and the dial 65 (torque-specifying means), which is capable of specifying, within a prescribed high-low range, to the controller 32 the setting of the clutch-actuation torque.

Furthermore, in the controller 32, the relationship between the clutch-actuation torques and the values in the high-low range is set such that, as shown in, for example, FIG. 10A, the change in the clutch-actuation torque in the range (first range) of steps 1-21 (range in which the values are low) is the same in both the low-speed mode and the high-speed mode. In addition, the relationship is set such that, in the range of steps 22-41 (another (a second) range outside of the (first) range in which the values are low), the clutch-actuation torque in the low-speed mode is higher than that in the high-speed mode.

Thereby, in the low-speed mode, it becomes possible to select a clutch-actuation torque (fastening torque) that is higher than the highest clutch-actuation torque that is available in the high-speed mode. In addition, in the range of steps 1-21, because the change in the clutch-actuation torques is the same for both the low-speed mode and the high-speed mode, there is little discomfort when the speed is changed, and therefore usability is also excellent.

Here in particular, in the controller 32, the clutch-actuation torques in the low-speed mode are set with a rising slope that is steeper for steps 22-41 than it is for steps 1-21. Thereby, it becomes possible to set the clutch-actuation torques over a wider range, which leads to an improvement in usability.

In addition, as shown in FIGS. 10A and 10C, in the range in which the clutch-setting step number is large (here, step 22 or higher), the clutch-setting step number is selectable only in the low-speed mode, and, in that range in which the clutch-setting step number is large, the clutch-actuation torques in the low-speed mode are higher than that in the high-speed mode. Thereby, a clutch-actuation torque that is higher in the low-speed mode can be reliably selected.

In addition, in another aspect of the present teachings, in the low-speed mode, clutch-setting step numbers (first torque-setting step numbers) of, for example, steps 1-41 are settable as the high-low range. In addition, in the high-speed mode, clutch-setting step numbers (second torque-setting step numbers) the same as the clutch-setting step numbers in the low-speed mode or in the range of, for example, steps 1-21, which is a smaller range, are settable as the high-low range. In addition, in the small range of steps 1-21, the torque-setting step numbers are set such that, as shown in FIG. 10A-10D, the change in the clutch-actuation torques is the same for both the low-speed mode and the high-speed mode. Furthermore, the clutch-actuation torque for the maximum step number in the low-speed mode is set to be larger than the clutch-actuation torque for the maximum step number in the high-speed mode.

Owing to these configurations, it becomes possible, in the low-speed mode, to select clutch-actuation torques that are higher than those in the high-speed mode.

In particular, in FIG. 10A, the second torque-setting step numbers (steps 1-21) in the high-speed mode are set to be fewer than the first torque-setting step numbers (steps 1-41) in the low-speed mode; and, in the low-speed mode, the slope of the clutch-actuation torque in the range of the second torque-setting step numbers (steps 1-21) is set shallower than the slope of the clutch-actuation torque from after the second torque-setting step numbers to the interval (steps 22-41) of the first torque-setting step numbers. Thereby, in the range in which the clutch-setting step numbers are large, the change in the clutch-actuation torques becomes large, which enables usage over a wider range.

In FIG. 10C, the second torque-setting step numbers (steps 1-21) in the high-speed mode are set to be fewer than the first torque-setting step numbers (steps 1-81) in the low-speed mode; and, in the low-speed mode, the slope of the clutch-actuation torque in the range of the second torque-setting step numbers (steps 1-21) is set to the same slope of the clutch-actuation torque from after the second torque-setting step numbers to the interval (steps 22-81) of the first torque-setting step numbers. Thereby, the clutch-setting step numbers and the clutch-actuation torques are proportionate, and therefore it becomes easy to change and use them.

In FIGS. 10B and 10D, the second torque-setting step numbers in the high-speed mode and the first torque-setting step numbers in the low-speed mode are set for the same steps 1-41, but the range in which the torque-setting step numbers are large is set such that the difference in the change in the clutch-actuation torques differs between the low-speed mode and the high-speed mode. Thereby, in the range in which the torque-setting step numbers are large, the change in the clutch-actuation torques between the different operating speed ranges becomes large.

In particular, in FIG. 10B, in the high-speed mode, the slope of the clutch-actuation torques in the range in which the torque-setting step numbers are large (steps 22-41) is the same as the slope of the clutch-actuation torques in the range in which the torque-setting step numbers are small (steps 1-21); and, in the low-speed mode, the slope of the clutch-actuation torques in the range in which the torque-setting step numbers are large (steps 22-41) is set such that it is steeper than the slope of the clutch-actuation torques in the range in which the torque-setting step numbers are small (steps 1-21). Thereby, even for the same setting step numbers, a difference in the clutch-actuation torques appears when the step number becomes large.

In particular, in FIG. 10D, in the high-speed mode, the slope of the clutch-actuation torques is zero in the range in which the torque-setting step numbers are large (steps 22-41); and, in the low-speed mode, the slope of the clutch-actuation torques in the range in which the torque-setting step numbers are large (steps 22-41) and the slope of the clutch-actuation torques in the range in which the torque-setting step numbers are small (steps 1-21) are set to the same slope. Thereby, even for the same setting step numbers, a difference in the clutch-actuation torques appears when the step number becomes large.

In addition, in the embodiments shown in FIGS. 10E and 10F, in both the low-speed mode and the high-speed mode, the same first torque-setting step numbers (steps 1-21 or steps 1-41) are settable as the high-low range; and, over the entire range of the first torque-setting step numbers, the clutch-actuation torques in the low-speed mode are set to be greater than the clutch-actuation torques in the high-speed mode. Thereby, the clutch-actuation torques becomes greater in the low-speed mode, which improves ease of use.

In particular, in FIG. 10E, the minimum step number (step 1) of the torque-setting step numbers in the low-speed mode is set the same as the clutch-actuation torque at the maximum step number (step 21) of the torque-setting step numbers in the high-speed mode. Thereby, the difference in the clutch-actuation torques is large even at the same setting step number.

In particular, in FIG. 10F, the clutch-actuation torques in the low-speed mode and the high-speed mode at the minimum step number (step 1) of the torque-setting step numbers are set the same; and, when the torque-setting step number becomes large, the difference between those clutch-actuation torques becomes large. Thereby, in the range in which the torque-setting step numbers are large, the change in the clutch-actuation torques between the high-speed mode and the low-speed mode becomes large.

It is noted that the structure for setting the clutch-actuation torque is not limited to the structure in which the dial, which constitutes the torque-specifying means, is provided on the battery-mount part as described in the above-described embodiment. A separate magnet can be fixed to the mode-changing ring, and the mode-changing ring can be made rotatable in the range of, for example, 200°. Furthermore, subtracting 60° needed to change the mode from 200°, the torque may be indicated by the rotational position of the magnet in the range of 140°.

In addition, it does not matter even if the dial is disposed at some other location, such as by being provided on the upper side of the handle. The structure of the dial itself can also be configured by eliminating the rod, providing shaft parts integrally with both ends of the dial, and supporting such by the housing. The cam and the tubular magnet may be disposed left-and-right reversed. The cam and the tubular magnet may be disposed lined up in the up-down direction. The cam and the coil spring may be eliminated, and a click sensation may be generated by a leaf spring or the like. The tubular magnet may be eliminated, and a magnet may instead be embedded directly in the dial.

In addition, the present teachings are not limited to a dial. For example, some other input method may also be used, such as by making the numerical value modifiable by a manipulation in which a button provided on the operation-and-display panel is pushed.

Furthermore, the structure for setting the clutch-actuation torque is not limited to usage in a hammer driver-drill and is also applicable to a driver-drill that does not comprise a hammer mechanism.

Effects of the Ease of Operation of the Dial

The hammer driver-drill 1 according to the above-described embodiment comprises, in particular, the main-body housing 6 (housing), the brushless motor 9 (motor), which is housed inside the main-body housing 6, and the spindle 26 (output shaft), which is rotationally driven by the rotation of the brushless motor 9. In addition, the manually rotatable dial 65 for modifying the rotational control of the brushless motor 9 is provided such that both its axial ends are rotatably supported by the main-body housing 6. Furthermore, the small-diameter parts 75 and the cover parts 76 (limiting means), which are for limiting the ingress of dust from both ends in the axial direction, are provided between the main-body housing 6 and the dial 65.

Owing to these configurations, even though the dial 65 for setting the electronic clutch is provided, satisfactory ease of operation and durability can be maintained.

Here in particular, the limiting means has a labyrinth structure in which the gaps between the main-body housing 6 and the dial 65 are bent by the small-diameter parts 75, which protrude from both ends of the dial 65 in the axial direction and whose diameter is smaller than the outer diameter of the dial 65, and the cover parts 76, which are provided on the main-body housing 6 and cover the small-diameter parts 75 from the outer side thereof in the radial direction. Thereby, it becomes possible to effectively limit the ingress of dust using a simple structure.

In addition, each small-diameter part 75 has a tube shape, and the cam 70 (cam member), which generates a click sensation by engaging when the dial 65 rotates, is disposed, such that it spans the main-body housing 6 and the dial 65, on the inner side of one of the small-diameter parts 75. Thereby, a labyrinth structure is formed in which the gap bends even at the outer circumference of the cam 70, and thereby the limiting of the ingress of dust becomes more effective.

Furthermore, the tubular magnet 68 (magnet) is held by the dial 65 so as to integrally rotate therewith, and the magnetic sensor 35 is provided at a location at which it opposes the tubular magnet 68. Thereby, changes in the magnetic field that arise with the rotation of the dial 65 are reliably detectable.

The tubular magnet 68 is disposed at a location at which it is offset in the axial direction relative to the dial 65.

Thereby, the adherence of iron filings and the like to the tubular magnet 68 does not hinder manual rotation of the dial 65.

The dial 65 is rotatable by 360° or greater in the one-direction side and the other-direction side in the rotational direction. Thereby, the manipulation for setting the clutch-actuation torque can be performed easily.

A surface of the dial 65 has a concave-convex (ridged) shape, and the hollow 6*c*, which has an arcuate shape and opposes the circumferential surface of the dial 65, is formed in the main-body housing 6 in a transverse-section direction of the dial 65. Thereby, even if foreign matter enters into the gap between the dial 65 and the hollow 6*c*, the foreign matter tends to discharge as the dial 65 is manually rotated.

Furthermore, the hammer driver-drill 1 according to the above-described embodiment comprises, in particular, the main-body housing 6 (housing), the brushless motor 9 (motor), which is housed inside the main-body housing 6, and the rotationally manipulatable (manually rotatable) dial 65 for modifying rotational control of the brushless motor 9, both ends of which dial 65 are rotatably supported by the main-body housing 6 in the axial direction. In addition, the cam surface 74*a* is provided on one-end side of the dial 65 in the axial direction and the cam 70 (cam member), which is engageable with the cam surface 74*a*, is provided on one-end side of the dial 65. Furthermore, the coil spring 73 (biasing means) biases the cam 70 toward the cam surface 74*a*.

Owing to these configurations, the coil spring 73 can cause the cam 70, which generates the click sensation, to always engage with the dial 65. Thereby, even though the dial 65 for setting the electronic clutch is provided, satisfactory ease of operation, durability, and the like can be maintained.

It is noted that the structure relating to the ease of operation of the dial is not limited to the above-described embodiment with regard to the labyrinth structure, and the relationship between the small-diameter parts and the cover parts may be reversed. That is, the small-diameter parts can be provided on the main-body housing, and the cover parts can be provided on the dial. In addition, the small-diameter parts and the cover parts can be doubly provided, and thereby the gaps may be provided with more bends. In addition, elastic body O-rings can also be inserted into the gaps. In addition, packing, gaskets, and the like may be used in the gaps.

In addition, modifications related to the dial, the rod, the cams, and the like are likewise possible in those configurations explained in the modified examples of the present teachings related to the setting of the clutch-actuation torque.

Furthermore, the structure relating to the ease of operation of the dial is not limited to usage in the hammer driver-drill according to the above-described embodiment and is also applicable to other power tools that do not comprise a hammer mechanism, such as a driver-drill. Examples of other power tools are multi-tools, grinders, reciprocating saws, and the like. The present teachings is also not limited to a dial for setting the electronic clutch.

Furthermore, in common with each of the above-described aspects and embodiments, the motor may be a commutator motor or the like instead of a brushless motor and may be an AC tool that uses an AC power supply instead of a battery pack.

Moreover, the subject matter below can also be abstracted from the description above.

A driver-drill comprising:

a motor;

a planet gear, which is driven by the motor;

a speed change internal gear, which meshes with the planet gear and is movable forward and rearward in an axial direction;

a sun gear, which meshes with the planet gear; and an output shaft, which is rotationally driven by the sun gear;

wherein a sensor, which is capable of detecting forward-rearward movement of the speed-change internal gear, is disposed downward of the sun gear in the radial direction.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved driver-drills.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the controller 32, is also understood as a corresponding method step or as a feature of a method step. In an analogous manner, aspects which have been described in the context of or as a method step also represent a description of a corresponding block or detail or feature of a corresponding device, such as the controller 32.

Depending on certain implementation requirements, exemplary embodiments of the controller 32 or controlling means of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the controller 32 or controlling means, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the electric motor 8 and other mechanical structures of the power tool.

Therefore, although some aspects of the controller 32 have been identified as "parts" or "units" or "steps", it is understood that such parts or units or steps need not be physically separate or distinct electrical components, but rather may be different blocks of program code that are executed by the same hardware component, e.g., one or more microprocessors.

EXPLANATION OF THE REFERENCE NUMBERS

1 Hammer driver-drill
2 Main body
3 Handle
4 Drill chuck
5 Battery pack
6 Main-body housing
9 Brushless motor
19 Rotary shaft
25 Gear assembly
26 Spindle
32 Controller
33 Operation-and-display panel
40 First gear case
41 Second gear case
42 Mode-changing ring
43 Large-diameter tube part
44 Small-diameter tube part
50 Speed-reducing mechanism
55 Speed change ring
60, 118 Magnets
61 Speed-and-position detection board
35, 62, 120 Magnetic sensors
65 Dial
66 Rod
68 Tubular magnet
92 First cam
93 Second cam
100 Hammer-changing ring
115 Clutch ring
119 Clutch-detection board

The invention claimed is:

1. A rotary tool comprising:
a motor having an axis of rotation extending in a forward-rearward direction of the rotary tool;
a grip part located below the axis of rotation in an up-down direction perpendicular to the forward-rearward direction;
a planet gear configured to be driven by the motor;
an internal gear configured to change a speed, the internal gear meshing with the planet gear and being movable in the forward-rearward direction;
a sun gear configured to mesh with the planet gear;
an output shaft configured to be rotationally driven by the sun gear; and
a sensor configured to detect the forward-rearward movement of the internal gear, the sensor being disposed downward of the sun gear in the up-down direction.

2. The rotary tool according to claim 1, further comprising:
a speed change member configured to move the internal gear in the forward-rearward direction; and
a detected part on the speed change member,
wherein the sensor is configured to detect the forward-rearward movement of the internal gear by detecting a forward-rearward movement of the detected part.

3. The rotary tool according to claim 2, wherein:
the detected part is a permanent magnet,
the sensor is a magnetic sensor,
the rotary tool comprises a gear case made of a polymer, and
a portion of the gear case extends between the permanent magnet and the magnetic sensor.

4. The rotary tool according to claim 3, further comprising:
a controller configured to control the motor; and
a connector electrically connecting the magnetic sensor to the controller,
wherein the controller is configured to modify the control of the motor based on an output of the magnetic sensor.

5. A driver-drill comprising:
a motor; and
an output shaft configured to be rotationally driven by the motor,
wherein:
the driver-drill has at least two selectable action modes that include at least a drilling mode and a screwdriving mode, in the drilling mode, rotation of the output shaft is maintained regardless of an amount of torque being applied to the output shaft, in the screwdriving mode, rotation of the output shaft is interrupted at a prescribed torque, and the driver-drill comprises a first sensor and a first detected part configured to detect which of the two action modes is selected, the first detected part being radially spaced apart from the output shaft.

6. The driver-drill according to claim 5, wherein:

the first detected part is provided directly or indirectly on a mode-changing member configured to change the action mode by manual rotation, and the first sensor is configured to detect movement of the first detected part caused by the manual rotation of the mode-changing member.

7. The driver-drill according to claim 5, wherein:

the driver-drill further has a selectable hammer drilling mode in addition to the two action modes, and in the hammer drilling mode, rotation of the output shaft is maintained regardless of the amount of torque being applied to the output shaft.

8. The driver-drill according to claim 5, further comprising:

a controller configured to control the motor; and a connector electrically connecting the first sensor to the controller, wherein:

the first sensor is a magnetic sensor, and the controller is configured to control the motor based on an output of the first sensor.

9. The driver-drill according to claim 5, further comprising:

an aluminum gear case, wherein a portion of the aluminum gear case extends between the first sensor and the first detected part.

10. The driver-drill according to claim 5, wherein:

the motor has an axis of rotation extending in a forward-rearward direction of the rotary tool, a grip part is located below the axis of rotation in an up-down direction perpendicular to the forward-rearward direction, and the first detected part is a permanent magnet mounted in a hollow part in a holding member, the hollow part being open in a downward direction.

11. The driver-drill according to claim 5, further comprising:

a light configured to illuminate a vicinity of the output shaft; and a trigger, wherein:

the motor has an axis of rotation extending in a forward-rearward direction of the rotary tool, a grip part is located below the axis of rotation in an up-down direction perpendicular to the forward-rearward direction, the light is disposed downward of the sensor, and the trigger is disposed downward of the light.

12. The driver drill according to claim 5, wherein:

the motor has an axis of rotation extending in a forward-rearward direction of the rotary tool, and the driver drill further includes:

a grip part located below the axis of rotation in an up-down direction perpendicular to the forward-rearward direction;

planet gears configured to be driven by the motor;

an internal gear configured to be movable in the forward-rearward direction to change a rotational speed range of the output shaft, the internal gear meshing with the planet gears;

a sun gear configured to mesh with the planet gears; and a second sensor configured to detect forward-rearward movement of the internal gear, the second sensor being disposed downward of the sun gear in the up-down direction.

13. The rotary tool according to claim 12, further comprising:

a speed change member configured to move the internal gear in the forward-rearward direction; and a second detected part on the speed change member, wherein the second sensor is configured to detect the forward-rearward movement of the internal gear by detecting forward-rearward movement of the second detected part.

14. The rotary tool according to claim 13, wherein:

the second detected part is a permanent magnet, the second sensor is a magnetic sensor, the rotary tool comprises a gear case made of a polymer, and a portion of the gear case gear case made of the polymer extends between the second detected part and the second sensor.

15. The rotary tool according to claim 14, further comprising:

a controller configured to control the motor; and a connector electrically connecting the second sensor to the controller, wherein the controller is configured to control the motor based on an output of the second sensor.

16. The driver drill according to claim 5, further comprising:

a speed reduction mechanism between the motor and the output shaft: and an aluminum gear case housing the speed reduction mechanism and having a double-tube shape that includes a small-diameter tube part and a large-diameter tube part, wherein:

the small-diameter tube-part is positioned radially outward of the output shaft, the first detected part is positioned between the small-diameter tube part and the large-diameter tube part, and the first sensor is located radially outward of the large-diameter tube part.

* * * * *